United States Patent [19]

Auslander et al.

[11] Patent Number: 5,835,928
[45] Date of Patent: Nov. 10, 1998

[54] CIRCUITRY AND METHOD FOR RELATING FIRST AND SECOND MEMORY LOCATIONS WHERE THE SECOND MEMORY LOCATION STORES INFORMATION FROM THE FIRST MEMORY LOCATION

[75] Inventors: Marc Alan Auslander, Millwood; Albert Chang, Yorktown Heights; Robert Morris Meade, Wassaic, all of N.Y.

[73] Assignee: International Business Machines Corporation, Armonk, N.Y.

[21] Appl. No.: 658,913

[22] Filed: May 31, 1996

Related U.S. Application Data

[63] Continuation of Ser. No. 173,448, Dec. 22, 1993, abandoned.

[51] Int. Cl.$^6$ .............................. G06F 12/00; G06F 13/00
[52] U.S. Cl. .................. 711/3; 364/DIG. 1; 364/DIG. 2; 364/243.4; 364/243.41; 711/206; 711/207; 711/100; 711/119; 711/122; 711/128
[58] Field of Search ........................ 364/DIG. 1, DIG. 2, 364/243.4, 243.45; 395/416, 417, 427, 446, 449, 455; 711/3, 206, 207, 100, 119, 122, 128

[56] References Cited

U.S. PATENT DOCUMENTS

| | | | |
|---|---|---|---|
| 3,723,976 | 3/1973 | Alvarez et al. | 340/170.5 |
| 3,868,642 | 2/1975 | Sachs | 365/49 |
| 4,077,059 | 2/1978 | Cordi et al. | 395/600 |
| 4,441,155 | 4/1984 | Fletcher et al. | 364/200 |
| 4,797,814 | 1/1989 | Brenza | 395/403 |
| 4,807,110 | 2/1989 | Pomerene et al. | 395/421.03 |
| 4,872,138 | 10/1989 | Ciacci | 395/49 |
| 4,905,188 | 2/1990 | Chuang et al. | 395/455 |
| 5,014,195 | 5/1991 | Farrell et al. | 395/455 |
| 5,210,845 | 5/1993 | Crawford et al. | 395/455 |
| 5,235,697 | 8/1993 | Steely, Jr. et al. | 395/464 |
| 5,353,424 | 10/1994 | Parton et al. | 395/455 |
| 5,392,410 | 2/1995 | Liu | 395/3 |
| 5,410,663 | 4/1995 | Blackburn et al. | 395/400 |
| 5,446,850 | 8/1995 | Jeremiah et al. | 395/375 |

OTHER PUBLICATIONS

*IBM Technical Disclosure Bulletin*, vol. 26, No. 11, Apr. 1984, pp. 6069–6070, "Cross–Interrogate Directory for a Real, Virtual or Combined Real/Virtual Cache".

*IBM Technical Disclosure Bulletin*, vol. 31, No. 8, Dec. 1989, pp. 444–447, "One–Cycle Cache Design".

*IBM Technical Disclosure Bulletin*, vol. 31, No. 8, Jan. 1989, pp. 12–13, "Effecting a One–Cycle Cache Access in a Pipeline Having Combined D/A Using a BLAT".

*IBM Technical Disclosure Bulletin*, vol. 21, No. 2, Jul. 1978, pp. 663–664, "Fast Address Translation in Systems Using Virtual Addresses and a Cache Memory".

*IBM Technical Disclosure Bulletin*, vol. 21, No. 11, Apr. 1979, p. 4541, "Cache Management System Using Virtual and Real Tags in the Cache Directory".

*IBM Technical Disclosure Bulletin*, vol. 23, No. 9, Feb. 1981, pp. 3969–3971, "Reference Associative Cache Mapping".

(List continued on next page.)

*Primary Examiner*—Tod R. Swann
*Assistant Examiner*—Tuan V. Thai
*Attorney, Agent, or Firm*—Mark E. McBurney; Michael A. Davis, Jr.

[57] ABSTRACT

A first group of memory locations stores information. The first group is arranged into multiple congruence classes of memory locations. The congruence classes include a first congruence class having more than one memory location. A second group of memory locations stores information from the first group of memory locations. Directory locations store information relating the first and second groups of memory locations. The directory locations include a first directory location able to store information relating a particular one of the second group of memory locations to any memory location of more than one of the congruence classes including the first congruence class.

21 Claims, 11 Drawing Sheets

OTHER PUBLICATIONS

*IBM Technical Disclosure Bulletin,* vol. 32, No. 5B, Oct. 1989, pp. 415–417, "Interface Logic Control for a Fully Associative Table Lookup/Lookaside Buffer".

*IBM Technical Disclosure Bulletin,* vol. 33, No. 1A, Jun. 1990, pp. 287–290, "Array Address Relocation Mechanism".

*IBM Technical Disclosure Bulletin,* vol. 33, No. 3A, Aug. 1990, pp. 326–327, "Performance Enhancement for Multiprocessor Virtual Address Caches".

*IBM Technical Disclosure Bulletin,* vol. 34, No. 4A, Sep. 1991, pp. 154–157, "Pass–Device Magnitude Comparator Cell".

*IBM Technical Disclosure Bulletin,* vol. 34, No. 5, Oct. 1991, pp. 204–207, "Look–up for Logical Address–Based Cache Directory".

*IBM Technical Disclosure Bulletin,* vol. 34, No. 7B, Dec. 1991, pp. 395–397, "Cache Directory Lookup with Partial Address".

*Computing Surveys,* vol. 14, No. 3, Sep. 1982, pp. 473–530, "Cache Memories" by A. Smith, University of California, Berkley.

Handy, Jim, *The Cache Memory Book,* Academic Press, Inc., pp. 49–53, Aug. 28, 1993.

| 504a | 0 | index 0 | 502a |
|---|---|---|---|
| 504b | 0 | index 1 | 502b |
| 504c | 0 | index 2 | 502c |
| 504d | 0 | index 3 | 502d |
| 504e | 0 | index 4 | 502e |
| 504f | 0 | index 5 | 502f |
| 504g | 0 | index 6 | 502g |
| 504h | 0 | index 7 | 502h |

FIG. 7a

| 504a | 0 | index 0 | 502a |
|---|---|---|---|
| 504b | 0 | index 1 | 502b |
| 504c | 1 | index 2 | 502c |
| 504d | 0 | index 3 | 502d |
| 504e | 0 | index 4 | 502e |
| 504f | 0 | index 5 | 502f |
| 504g | 0 | index 2 | 502g |
| 504h | 0 | index 7 | 502h |

FIG. 7b

| 504a | 0 | index 0 | 502a |
|---|---|---|---|
| 504b | 0 | index 1 | 502b |
| 504c | 0 | index 2 | 502c |
| 504d | 0 | index 3 | 502d |
| 504e | 0 | index 4 | 502e |
| 504f | 0 | index 5 | 502f |
| 504g | 1 | index 2 | 502g |
| 504h | 0 | index 7 | 502h |

| 504a | 0 | index 0 | 502a |
|---|---|---|---|
| 504b | 0 | index 1 | 502b |
| 504c | 1 | index 2 | 502c |
| 504d | 0 | index 3 | 502d |
| 504e | 0 | index 4 | 502e |
| 504f | 0 | index 2 | 502f |
| 504g | 1 | index 2 | 502g |
| 504h | 0 | index 7 | 502h |

ND SECOND MEMORY LOCATIONS
CIRCUITRY AND METHOD FOR RELATING FIRST AND SECOND MEMORY LOCATIONS WHERE THE SECOND MEMORY LOCATION STORES INFORMATION FROM THE FIRST MEMORY LOCATION

This is a continuation of application Ser. No. 08/173,448 filed Dec. 22, 1993 abandoned.

TECHNICAL FIELD OF THE INVENTION

This patent application relates in general to data processing and in particular to a method and circuitry for caching information.

BACKGROUND OF THE INVENTION

Many systems for processing information include both a system memory and a cache memory. A cache memory is a relatively small high-speed memory that stores a copy of information from one or more portions of the system memory. Frequently, the cache memory is physically distinct from the system memory. Such a cache memory can be integral with a processor device of the system or be non-integral with the processor.

Information can be copied from a portion of the system memory into the cache memory. The information in the cache memory can be modified. Further, modified information from the cache memory can be copied back to a portion of the system memory. Accordingly, it is important to map information in the cache memory relative to the system memory.

Previous techniques for caching information include direct mapping, set-associative mapping and fully associative mapping. A shortcoming of the direct mapping technique is that, with the range of all possible addresses being logically arranged into multiple subsets, the cache memory is allocated to store information for only one respective address of each and every subset at any single moment. A shortcoming of the set-associative technique is that, after information is output from the cache memory, a portion of such information is selected in response to an address comparison, resulting in delayed selection of information output from the cache memory. A shortcoming of the fully associative technique is that a CAM array of such a technique is relatively large, expensive, complex and slow.

Thus, a need has arisen for a method and circuitry for caching information in which, with the range of all possible addresses being logically arranged into multiple subsets, a cache memory can be allocated to store information for more than one address of a subset at any single moment. Also, a need has arisen for a method and circuitry for caching information in which, with the range of all possible addresses being logically arranged into multiple subsets, a cache memory can be allocated to store information for a respective address of less than all subsets at any single moment. Further, a need has arisen for a method and circuitry for caching information in which there is not delayed selection (in response to an address comparison) of information output from a cache memory. Moreover, a need has arisen for a method and circuitry for caching information in which a CAM array is significantly smaller, less expensive, less complex and faster than a CAM array of the fully associative technique.

SUMMARY OF THE INVENTION

In a method and circuitry for caching information, multiple first memory locations store information. The first memory locations are of multiple classes, and each class includes multiple ones of the first memory locations. Multiple second memory locations store information from the first memory locations. Multiple directory locations store information relating the first and second memory locations. Each directory location is able to relate a second memory location to any of multiple first memory locations in more than one class.

It is a technical advantage of the present invention that, with the range of all possible addresses being logically arranged into multiple subsets, a cache memory can be allocated to store information for more than one address of a subset at any single moment.

It is another technical advantage of the present invention that, with the range of all possible addresses being logically arranged into multiple subsets, a cache memory can be allocated to store information for a respective address of less than all subsets at any single moment.

It is yet another technical advantage of the present invention that there is not delayed selection (in response to an address comparison) of information output from a cache memory.

It is yet a further technical advantage of the present invention that a CAM array is significantly smaller, less expensive, less complex and faster than a CAM array of the fully associative technique.

BRIEF DESCRIPTION OF THE DRAWINGS

An exemplary embodiment of the present invention and its advantages are better understood by referring to the following descriptions and accompanying drawings, in which:

FIGS. 7a–e are conceptual illustrations of an exemplary camlet of the circuitry of FIG. 5.

DETAILED DESCRIPTION

An exemplary embodiment of the present invention and its advantages are better understood by referring to FIGS. 1–8 of the drawings, like numerals being used for like and corresponding parts of the accompanying drawings.

Figure 1A:
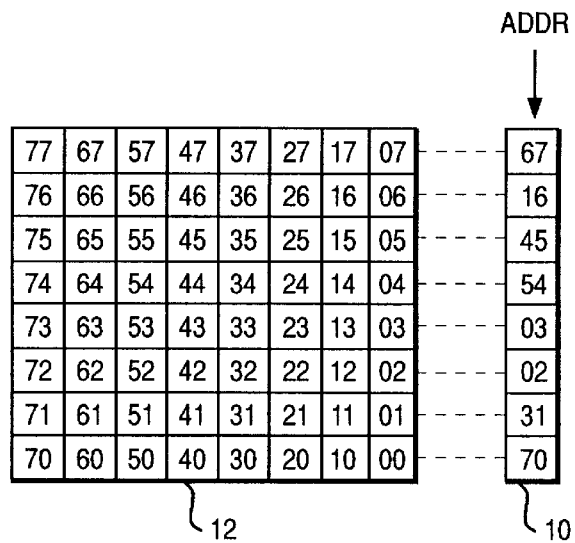
FIGS. 1a–c are conceptual illustrations of exemplary mapping techniques for caching information, according to the prior art.
Figure 1B:
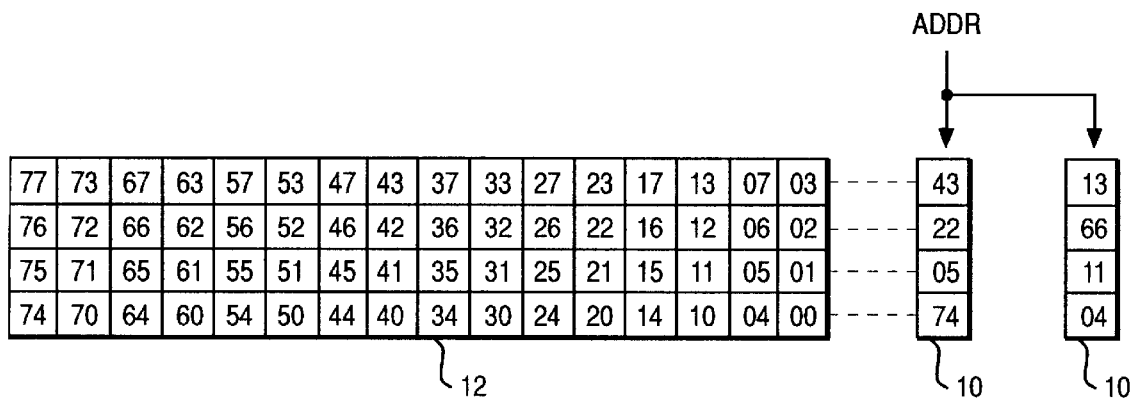
Figure 1C:
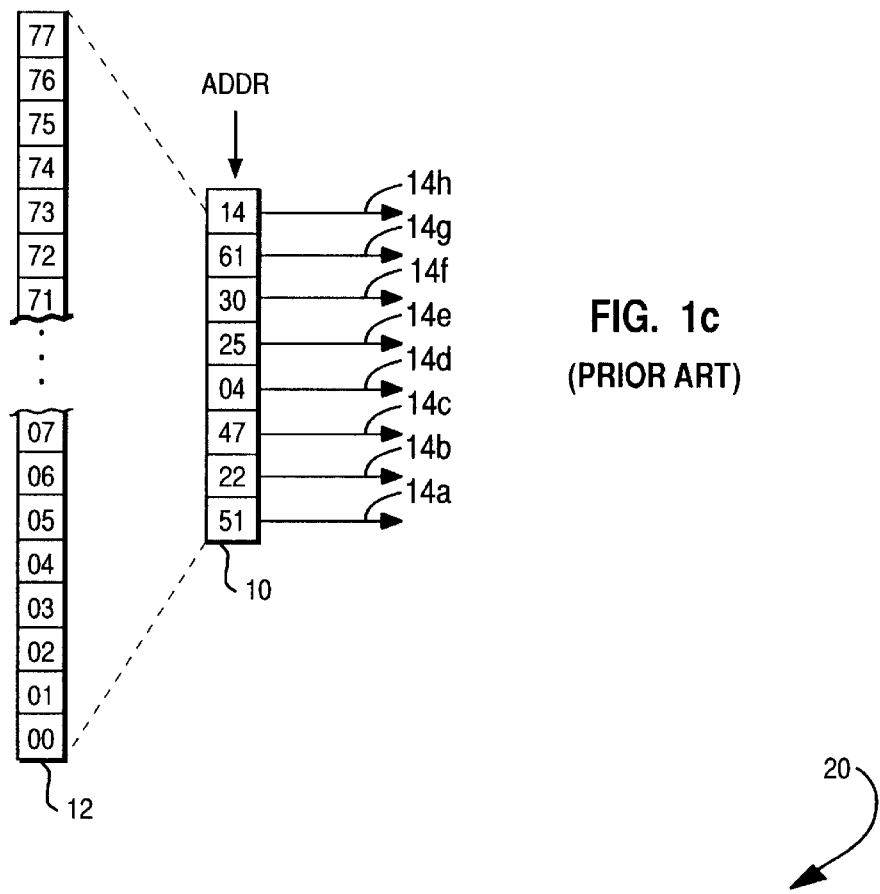

FIGS. 1a–c are conceptual illustrations of exemplary mapping techniques for caching information, according to the prior art. A cache directory 10 has $p=2^k=8$ entries, each associated with a respective block of information within a cache memory. A matrix 12 has $q=2^{m+k}=64$ octal addresses, each representing a respective block of information within a secondary memory. FIGS 1a–c show each block of matrix 12 together with the block's respectively associated address. Each of the q octal addresses of matrix 12 has m+k=6 address bits.

FIG. 1a illustrates a direct mapping technique. In FIG. 1a, matrix 12 and directory 10 are logically arranged into $p=2^k=8$ congruence classes. A congruence class is specified by an address's low-order k address bits. Accordingly, each congruence class includes multiple addresses, all of which share the same low-order k address bits. For FIG. 1a, k=3 and m=3.

For example, in FIG. 1a, one congruence class includes all addresses whose low-order three address bits are octal 7. This congruence class includes the octal addresses 07, 17, 27, 37, 47, 57, 67 and 77. Likewise, another congruence class includes the octal addresses 02, 12, 22, 32, 42, 52, 62 and 72.

In FIG. 1a, each congruence class has one respective preassigned associated entry within cache directory 10. Accordingly, at any single moment, the cache memory stores information for only a single address of a congruence class's this single address is specified in the congruence class's associated entry of cache directory 10. For example, in the congruence class's associated entry, cache directory 10 can store a tag including the single address's high-order m address bits. For FIG. 1a, m=3.

As an example, in FIG. 1a, from among the eight addresses whose low order three address bits are octal 5, cache directory 10 indicates that the cache memory stores information for only octal address 45 whose tag value is octal 4. Similarly, from among the eight addresses whose low order three address bits are octal 1, cache directory 10 indicates that the cache memory stores information for only octal address 31.

Accordingly, the low-order k address bits of an address ADDR specify the congruence class of ADDR. Moreover, the low-order k address bits operate as an index to access the congruence class's associated entry within cache directory 10 and its associated block of information within the cache memory by binary decoding. The indexed entry of cache directory 10 is read and compared with ADDR. If ADDR matches the indexed entry, then the indexed block of the cache memory stores information for ADDR.

A disadvantage of the direct mapping technique is that storage in the cache memory of one address's information excludes the storage of information for all other addresses of the same congruence class. This disadvantage is augmented by the fact that the number ($2^k$) of congruence classes is limited to the number ($2^k$) of entries in cache directory 10, so that a large number of addresses are forced to share a single entry in cache directory 10. Likewise, all addresses of a single congruence class are forced to share a single entry in the cache memory.

FIG. 1b illustrates an n-way set-associative mapping technique, where n=2. In FIG. 1b, matrix 12 and directory 10 are logically arranged into p/n=4 congruence classes. A congruence class is specified by an address's low-order y address bits, where $p/n=2^y$. Accordingly, each congruence class includes multiple addresses, all of which share the same low-order y address bits. For FIG. 1b, k=3 and y=2.

For example, in FIG. 1b, one congruence class includes all addresses whose low-order two address bits have a value=3. This congruence class includes the octal addresses 03, 07, 13, 17, 23, 27, 33, 37, 43, 47, 53, 57, 63, 67, 73 and 77. Likewise, another congruence class includes the octal addresses 01, 05, 11, 15, 21, 25, 31, 35, 41, 45, 51, 55, 61, 65, 71 and 75.

In FIG. 1b, cache directory 10 is logically arranged into two columns having four blocks each. Thus, each congruence class has a respective preassigned associated set of first and second entries within cache directory 10. Accordingly, at any single moment, the cache memory stores information for first and second addresses of a congruence class; the first and second addresses are specified in the congruence class's associated set of first and second entries within cache directory 10. For example, in the first associated entry, cache directory 10 can store a first tag including the first address's high-order m+1 address bits; in the second associated entry, cache directory 10 can store a second tag including the second addresses high-order m+1 address bits. For FIG. 1b, m=3.

As an example, in FIG. 1b, from among the sixteen addresses whose low order two address bits have a value=1, cache directory 10 indicates that the cache memory stores information for only octal address 05 and octal address 11. Similarly, from among the sixteen addresses whose low order two address bits have a value=3, cache directory 10 indicates that the cache memory stores information for only octal address 43 and octal address 13.

Accordingly, the low-order y address bits of address ADDR specify the congruence class of ADDR. Moreover, the low-order y address bits operate as an index to the congruence class's associated set of two entries within cache directory 10 and its associated set of two blocks within the cache memory. The two indexed entries of cache directory 10 are read and compared with ADDR. If ADDR matches one of the indexed entries, then the matching entry's associated block of the cache memory stores information for ADDR. A disadvantage of the set-associative technique is delayed selection of information output from the cache memory, resulting from selection between the two indexed entries of cache directory 10.

FIG. 1c illustrates a fully associative mapping technique. In FIG. 1c, matrix 12 and directory 10 are not logically arranged into congruence classes. Accordingly, at any single moment, the cache memory can store information for any group of eight addresses; these eight addresses are specified in the eight entries of cache directory 10. For example, cache directory 10 can store eight tags, each including all bits of an address.

In FIG. 1c, cache directory 10 is structured as a content addressable memory ("CAM") array of p=8 CAM entries by m+k=6 address bits. As a CAM array, cache directory 10 inputs address ADDR and compares it simultaneously with all addresses in the eight CAM entries. If ADDR matches any CAM entry's address, then a respective one of match lines 14a–h is asserted to directly select the cache memory block storing information for ADDR. Thus, cache directory 10 operates as a decoder and accessing mechanism for the cache memory.

A disadvantage of the fully associative technique is the expense, complexity, and diminished speed of a CAM array having m+k address bit lines by p match lines. This is especially true as the number (m+k) of address bits increases in conjunction with the number ($q=2^{m+k}$) of secondary memory blocks.

Figure 2:
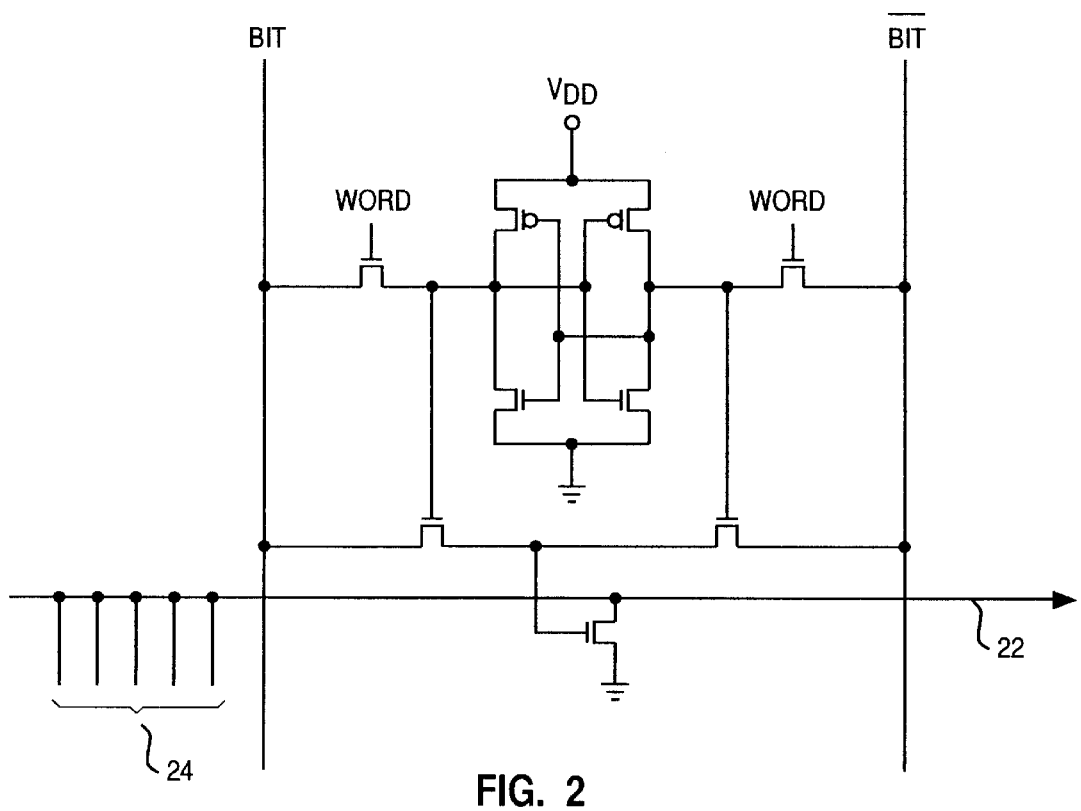
FIG. 2 is a schematic electrical circuit diagram of an exemplary CMOS CAM cell.

FIG. 2 is a schematic electrical circuit diagram of an exemplary CMOS CAM cell, indicated generally at 20. CAM cell 20 inputs a binary value on its bit lines BIT and BIT for comparison with a binary value previously stored in CAM cell 20. If the input binary value fails to match the previously stored binary value, then CAM cell 20 pulls down match line 22.

A CAM line is formed by multiple CAM cells (such as CAM cell 20) each connected to common match line 22. In addition to CAM cell 20, other CAM cells (not shown) of the CAM line are connected to common match line 22 through lines 24. Accordingly, the state of match line 22 indicates whether all CAM cells connected thereto have matches between their respective input binary values and their respective previously stored binary values. In this manner, the CAM line inputs a multi-bit binary address for comparison with a multi-bit binary address previously stored in the CAM line. If the input binary address matches the previously stored binary address, then the CAM line asserts common match line 22 to directly select the CAM line's associated block of information within the cache memory.

Figure 3:
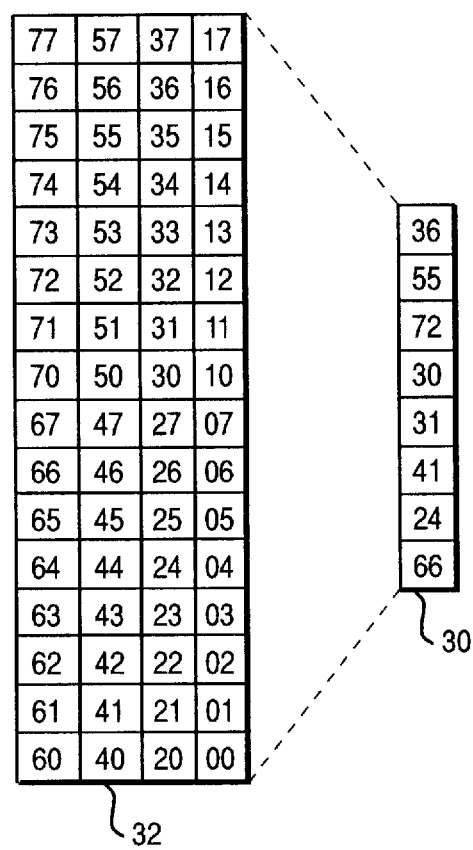
FIG. 3 is a conceptual illustration of a semi-associative mapping technique for caching information, according to the preferred embodiment.

FIG. 3 is a conceptual illustration of a semi-associative mapping technique for caching information, according to the preferred embodiment. A cache directory 30 has $p=2^k=8$ entries (or "locations"), each associated with a respective block (or "location") of information within a cache memory (shown in FIGS. 4–6 and 8). A matrix 32 has $q=2^{m+k}=64$ octal addresses, each representing a respective block (or "location") of information within a secondary memory (shown in FIG. 6). Each of the q octal addresses of matrix 32 has m+k=6 address bits.

In FIG. 3, matrix 32 and directory 30 are logically arranged into $2^{(k+j)}$ congruence classes, where $2^k$ is a number of primary congruence classes and $2^j$ is a number of secondary congruence classes ("congruence subclasses"). For FIG. 3, $p*2=2^{(k+j)}=16$, so that k=3 and j=1. A primary/secondary congruence class is specified by an address's index (k+j) address bits. Accordingly, each congruence class includes multiple addresses, all of which share the same index (k+j) address bits.

For example, in FIG. 3, one congruence class includes all addresses whose index (k+j) address bits are 0001. This congruence class includes the octal addresses 01, 21, 41 and 61. Likewise, another congruence class (whose index (k+j) address bits are 1001) includes the octal addresses 11, 31, 51 and 71.

In a significant aspect of the preferred embodiment, congruence classes are not preassigned to entries within cache directory 30. Instead, congruence classes are dynamically associated with (or "allocated to") entries within cache directory 30. Accordingly, each cache directory 30 entry is able to relate a cache memory block to any of multiple secondary memory blocks in more than one congruence class.

At any single moment, up to $2^k$ of the $2^{(k+j)}$ congruence classes have respective associated entries within cache directory 30 in any grouping and in any order. Accordingly, at any single moment, the cache memory stores information for up to $2^k$ of the $2^{(k+j)}$ congruence classes in any grouping and in any order. The value of a congruence class is stored in the k+j CAM cells of the congruence class's dynamically associated entry within cache directory 30. In a congruence class's associated entry within cache directory 30, one of multiple addresses of the congruence class is specified. For example, in the congruence class's associated entry, cache directory 30 can store a tag including the address's high-order (m−j) address bits. For FIG. 3, m=3.

As an example, in FIG. 3, from among the four addresses whose index (k+j) address bits are 1101 (octal addresses 15, 35, 55 and 75), cache directory 30 indicates that the cache memory stores information for octal address 55. In such a situation, the k+j index bits 1101 are stored in the CAM bits portion of the congruence class's cache directory 30 entry, and the m−j tag bits are stored in the tag portion of the congruence class's cache directory 30 entry. By comparison, cache directory 30 indicates that the cache memory stores information for none of the four addresses (octal addresses 03, 23, 43 and 63) whose index (k+j) address bits are 0011.

In an exemplary embodiment, a particular congruence class is allowed only one associated entry within cache directory 30, such that the cache memory is able to store information for only one address of the particular congruence class at any single moment. By comparison, in the preferred embodiment, a particular congruence class is allowed multiple associated entries within cache directory 30 in any grouping and in any order, such that the cache memory is able to store information for multiple addresses of the particular congruence class at any single moment in any grouping and in any order.

Figure 4:
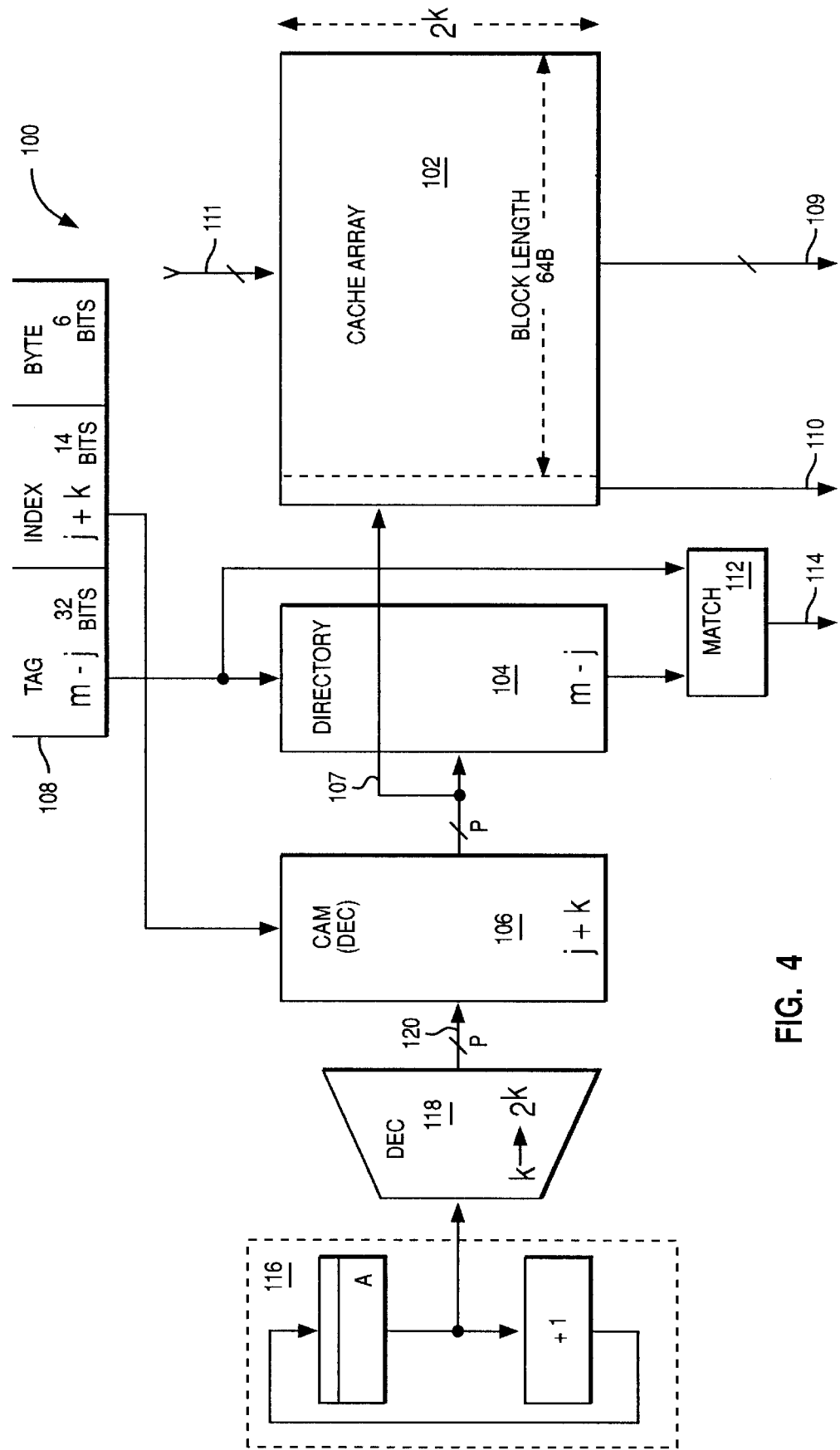
FIG. 4 is a block diagram of first exemplary circuitry for caching information according to the semi-associative mapping technique of FIG. 3.

FIG. 4 is a block diagram of first exemplary circuitry, indicated generally at 100, for caching information according to the semi-associative mapping technique of FIG. 3. FIG. 4 illustrates semi-associative mapping for a 32 kilobyte RAM cache memory array 102 having $p=2^k=512$ blocks of 64 bytes each. A cache directory 104 has p entries, each associated with a respective block of information within cache memory array 102. In order to achieve a random association between the $2^{(k+j)}$ congruence classes and the $p=2^k$ entries within cache directory 104, circuitry 100 includes a decoder CAM array 106 having (k+j) bits by p CAM match word-lines 107.

Cache directory 104 itself is a RAM array of (m−j) address bits by p lines. In FIG. 4, m=37, k=9, j=5, m−j=32, k+j=14, and p=512. Accordingly, cache directory 104 includes 512 entries of 32 bits each, in addition to control bits such as tags and check-bits. The low-order six bits of a 52-bit accessing address 108 select one of 64 bytes in a block of information output by cache memory array 102.

A congruence class is specified by an address's index (k+j) address bits. Decoder CAM array 106 assigns a congruence class to an entry within cache directory 104 by storing the congruence class's index (k+j) address bits at one of the p entries of decoder CAM array 106. During a first cycle, if a congruence class represented by the (k+j) bits of accessing address 108 has an assigned entry within cache directory 104, then decoder CAM array 106 asserts a respective one of p word-lines 107 to directly select the assigned entry within cache directory 104 and also to select the assigned entry's associated block of information within cache memory array 102.

In response to the asserted p word-line, cache directory 104 outputs the (m−j) address bits from the selected cache directory entry to a comparator 112; moreover, cache memory array 102 asserts a decoder hit line 110 and outputs the 64-byte block of information from the selected cache memory array block to a bus 109. By comparison, during the first cycle, if the congruence class represented by the (k+j) bits of accessing address 108 does not have an assigned entry within cache directory 104, then decoder CAM array 106 does not assert any of p word-lines 107; moreover, cache memory array 102 does not assert decoder hit line 110.

During a second cycle, if comparator 112 determines the (m−j) bits of accessing address 108 match the (m−j) address bits output by cache directory 104, then comparator 112 asserts a directory hit line 114. Accordingly, decoder CAM array 106 and cache directory 104 together operate as decoder/accessing circuitry for cache memory array 102. Notably, even if decoder hit line 110 is asserted, directory hit line 114 might not be asserted. Further, the information from cache memory array 102 is accessible during the first cycle independent of the address tag comparison. The address tag comparison can occur during the second cycle, in parallel with use of information accessed during the first cycle.

In an exemplary embodiment, an assignment counter 116 directs the loading and replacement of information in cache memory array 102. Initially, no information in cache memory array 102 is valid. Eventually, cache memory array 102 is filled with valid information according to any of several possible rules. According to one exemplary rule, assignment counter 116 is initialized to a value of 0. Cache memory array 102 is filled with valid information sequentially from a first block 0 to a last block (p−1).

For an operation to store information from an address into cache memory array 102, decoder hit line 110 indicates whether the congruence class represented by the (k+j) bits of accessing address 108 is already assigned to an entry within cache directory 104 (and consequently also to the assigned entry's associated block of information within cache memory array 102). If decoder hit line 110 indicates the congruence class is already assigned to an entry within cache directory 104, then input information from the secondary memory block is written to the assigned entry's associated block of information within cache memory array 102.

If decoder hit line 110 indicates the congruence class is not already assigned to an entry within cache directory 104, then a binary decoder 118 selects one of p word-lines 120 in response to a value of assignment counter 116. By selecting one of p word-lines 120, binary decoder 118 selects a corresponding entry of decoder CAM array 106. This selected entry of decoder CAM array 106 is written with the index (k+j) bits of accessing address 108, so that the congruence class is assigned to an entry within cache directory 104 (and consequently also to the assigned entry's associated block of information within cache memory array 102).

After the congruence class (represented by the (k+j) bits of accessing address 108) is assigned to an entry within cache directory 104, decoder CAM array 106 asserts one of p word-lines 107 to directly select the assigned entry within cache directory 104 and also to select the assigned entry's associated block of information within cache memory array 102. Then, cache directory 104 inputs the high-order (m−j) address bits of accessing address 108 and stores them in the selected cache directory entry; moreover, cache memory array 102 inputs the 64-byte block of information for accessing address 108 through a bus 111 and stores such information in the selected cache memory array block; finally, assignment counter 116 is incremented.

Eventually, cache memory array 102 is filled so that assignment counter 116 increments to (p−1). In such a situation, if decoder hit line 110 indicates a congruence class (represented by the (k+j) bits of accessing address 108) does not already have an assigned entry within cache directory 104, then such a congruence class is assigned to the last entry in decoder CAM array 106 and cache directory 104. Then, by resetting assignment counter 116 from value (p−1) to zero, the next such newly-assigned congruence class will displace the least recently-assigned congruence class in decoder CAM array 106 and cache directory 104.

In an alternative embodiment, the newly-assigned congruence class displaces a randomly selected one of the previously-assigned congruence classes. In another alternative embodiment, the newly-assigned congruence class displaces the least-recently accessed congruence class.

Likewise, if either decoder hit line 110 or directory hit line 104 indicates accessing address 108 is not equal to an address for which information is already stored in cache memory array 102, then previously stored information is read from a selected block of cache memory array 102 and written back to the secondary memory before new information is written to the selected block of cache memory array 102.

Decoder CAM array 106, cache directory 104 and cache memory array 102 can be formed by a single integrated memory having $p=2^k$ rows. Each such row would have a logical group of decoder index bits (the j+k address bits represented in FIG. 4 as decoder CAM array 106), a logical group of directory RAM tag bits (the m−j address bits represented in FIG. 4 as cache directory 104), and a logical group of information RAM represented in FIG. 4 as cache memory array 102. In some embodiments, it might be advantageous to have a separate non-integrated CAM array for decoder CAM array 106, and separate non-integrated RAMs for cache directory 104 and cache memory array 102.

In an exemplary embodiment, a particular congruence class is allowed only one assigned entry within cache directory 104, such that cache memory array 102 is able to store information for only one address of the particular congruence class at any single moment. In such an exemplary embodiment, storage in cache memory array 102 of one address's information excludes the storage of information for all other addresses of the same congruence class. Even in such an exemplary embodiment, the semi-associative technique is advantageous relative to the direct mapping technique, because the number $(2^{k+j})$ of congruence classes in the semi-associative technique is not limited to the number $(2^k)$ of entries in cache directory 104. Accordingly, relative to the direct mapping technique, the semi-associative technique is advantageous, because fewer addresses share a entry in cache directory 104, particularly as the value of j increases.

Unlike the set-associative technique, only one entry within cache directory 104 is compared with accessing address 108 to determine whether the address's information is stored in the entry's associated block of information within cache memory array 102. This comparison indicates validity of information output from cache memory array 102. Accordingly, the semi-associative technique does not have the set-associative technique's shortcoming of delayed selection of information output from the cache memory.

Relative to the fully-associative technique, the semi-associative technique's decoder CAM array 106 has a width of j+k bits instead of m+k bits. In general, j<<m, so the semi-associative technique's decoder CAM array 106 is significantly smaller, less expensive, less complex and faster than the fully associative technique's decoder CAM array. Moreover, the j+k width of decoder CAM array 106 does not necessarily increase in conjunction with the number $(q=2^{m+k})$ of secondary memory blocks.

Notably, as j is increased to equal m, the semi-associative mapping becomes fully associative. Conversely, as j is decreased to equal 0, the semi-associative mapping becomes direct. In an exemplary embodiment, a particular congruence class is allowed only one assigned entry within cache directory 104, such that cache memory array 102 is able to store information for only one address of the particular congruence class at any single moment. In such an exemplary embodiment, the congruence class partition is preferably of a fairly high order to achieve low miss rates. For an instruction cache, program trace analysis has shown that miss rates with j=3 are comparable to miss rates for a 2-way set-associative cache. For a data cache, program trace analysis has shown that miss rates with j=5 are comparable to miss rates for a 4-way set-associative cache.

Figure 5:
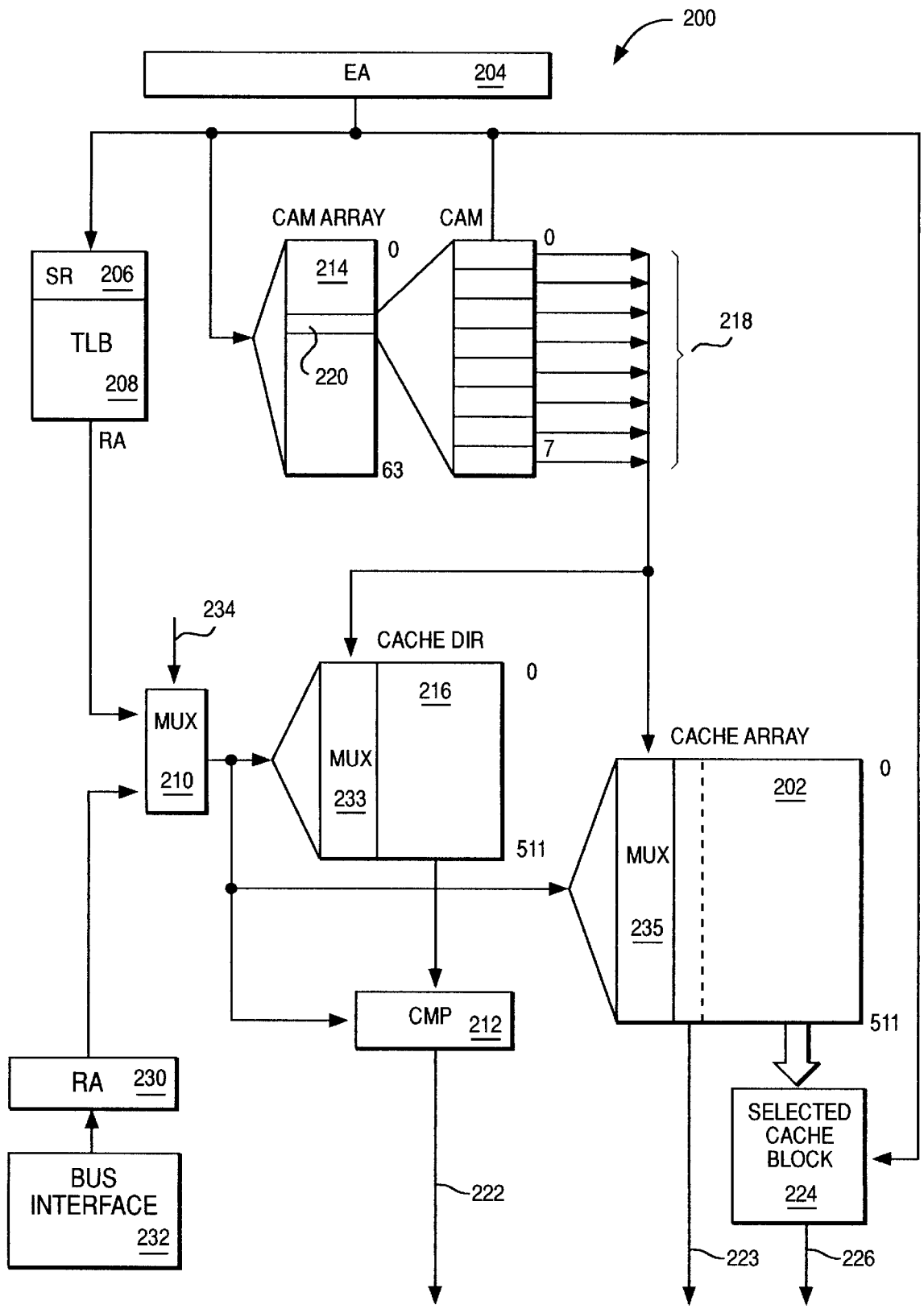
FIG. 5 is a block diagram of second exemplary circuitry for caching information according to the semi-associative mapping technique of FIG. 3.

FIG. 5 is a block diagram of second exemplary circuitry, indicated generally at 200, for caching information according to the semi-associative mapping technique of FIG. 3. As shown in FIG. 5, the semi-associative mapping technique can be used in combination with a real r-way set-associative mapping technique. An exemplary cache memory array 202 has a size of 32 kilobytes and a block size of 64 bytes, such that cache memory array 202 includes 512 lines each storing a respective block of information.

An accessing effective address ("EA") is latched in a buffer 204 and is translated through a segment register ("SR") 206 and a translation lookaside buffer ("TLB") 208 into an associated real address, which is output to a multiplexer 210. Notably, bits $2^0$ through $2^{11}$ of effective address EA are the same as bits $2^0$ through $2^{11}$ of its associated real address.

In the preferred embodiment, according to a 4-way set-associative mapping technique, 512 lines of a cache directory 216 are logically organized as 128 rows and 4 columns (or "sets"). Thus, each row of cache directory 216 includes four lines.

According to the semi-associative mapping technique, a decoder CAM array 214 has 512 CAM lines logically organized as 64 "camlets". Thus, each camlet of decoder CAM array 214 includes a respective set of eight CAM lines. Each such CAM line of decoder CAM array 214 stores a respective camlet entry, such that each camlet has eight camlet entries.

Each camlet of decoder CAM array 214 has two associated rows within cache memory array 202, such that the camlet's eight camlet entries are respectively associated with the eight blocks of its two associated rows within cache memory array 202. In this manner, each camlet entry (or "line") of decoder CAM array 214 is associated with a respective block (or "line") in cache memory array 202. Likewise, each camlet entry of decoder CAM array 214 is associated with a respective one of 512 entries (or "lines") in cache directory 216. To correspond with cache memory array 202, the 512 entries of cache directory 216 are logically organized as 128 rows and 4columns.

Each camlet entry of decoder CAM array 214 stores an effective address index including bits $2^{12}$ through $2^{19}$ of an effective address. A "camlet" address is formed by bits $2^6$ through $2^{11}$ of effective address EA. The camlet address selects one of the 64 camlets in decoder CAM array 214 and accordingly identifies the camlet's two associated rows in cache directory 216 and in cache memory array 202.

For an effective address lookup operation, the camlet address selects one of the 64 camlets in decoder CAM array 214. The effective address index (bits $2^{12}$ through $2^{19}$) of accessing address EA is compared with all 8-bit camlet entries 218 of the selected camlet 220. If one of camlet entries 218 matches the effective address index of accessing address EA and is valid, then a real address tag (bits $2^{12}$ through $2^{n-1}$ of a real address, where n=52) is output to a comparator 212 from the respective entry of cache directory 216 associated with the matching camlet entry; moreover, a block of information is output to a multiplexer 224 from the respective block in cache memory array 202 associated with the matching camlet entry, and circuitry 200 sets a decoder hit line 223 to a logic value of "1". In response to bits $2^0$ through $2^5$ of accessing address EA, multiplexer 224 outputs a word 226 (having a preselected size) from the block of information output by cache memory array 202.

In parallel with such an effective address lookup operation, accessing address EA is translated through SR 206 and TLB 208 into its associated real address, which is output through a multiplexer 210 to comparator 212. Comparator 212 compares the translated real address from multiplexer 210 against the real address tag from cache directory 216. If the translated real address matches the real address tag, then comparator 212 asserts a directory hit line 222, and the effective address lookup operation is successfully complete.

If one of camlet entries 218 matches the effective address index of accessing address EA, yet for some reason the translated real address from multiplexer 210 does not match the real address tag from cache directory 216, then circuitry 200 invalidates the matching camlet entry in decoder CAM array 214. Nevertheless, the information remains unchanged in the respective block in cache memory array 202 associated with the matching camlet entry.

Moreover, if the effective address lookup operation is not successful for any reason, then circuitry 200 executes a real address lookup operation for searching cache memory array 202 as a real 4-way set-associative cache in response to the translated real address RA. In an exemplary embodiment, one of the 128 rows of cache directory 216 is selected in response to bits $2^6$ through $2^{12}$ of the real address from multiplexer 210. Along the selected row of cache directory 216, circuitry 200 compares entries in the four columns with the real address from multiplexer 210.

For these four comparisons, each entry of cache directory 216 might store only bits $2^{13}$ through $2^{n-1}$ (where the real address has n=52 bits) of a real address. Nevertheless, each directory entry also stores bit $2^{12}$ of a real address, so that cache directory 216 and cache memory array 202 are more readily operated in combination with decoder CAM array 214 of the semi-associative technique.

During the real address lookup operation, if one of the compared entries of cache directory 216 matches the real address from multiplexer 210, then the matching directory entry's associated camlet entry in decoder CAM array 214 is modified to store a suitable effective address index so that accessing address EA is associated with the real address from multiplexer 210. Moreover, the matching directory entry's associated block of information (in a row of cache memory array 202 selected in response to bits $2^6$ through $2^{12}$ of the real address from multiplexer 210) is output from cache memory array 202 to multiplexer 224. In response to bits $2^0$ through $2^5$ of accessing address EA (which are the same as bits $2^0$ through $2^5$ of EA's associated real address), multiplexer 224 outputs a word 226 from the block of information output by cache memory array 202.

If the real address lookup operation is not successful for any reason, then circuitry 200 allocates a line of cache memory array 202 to store information for address EA according to a real-line replacement technique. For replacement of lines, circuitry 200 manages cache memory array 202 as a real cache. Accordingly, circuitry 200 writes information from the translated real address to the allocated line of cache memory array 202. Also, the allocated line's associated line in cache directory 216 is modified to store a suitable real address tag (bits $2^{12}$ through $2^{n-1}$ of the translated real address from multiplexer 210, where n=52), and the associated camlet entry in decoder CAM array 214 is modified to store a suitable effective address index, so that accessing address EA is associated with the real address from multiplexer 210.

The choice of 64 "camlets" is an example. In an alternative embodiment, the "camlet" address is formed by fewer bits from the low order twelve bits of accessing address EA, in order to address fewer camlets. In such an alternative embodiment, the number of entries per camlet is higher, and the number of bits per camlet entry is higher. For example, with only sixteen camlets, the number of entries per camlet would be thirty-two, and the number of bits per effective address index would be ten. For larger caches, it might be preferable to add bits to the effective address index to improve the statistical performance. Such additional bits would come from the high-order bits of accessing address EA.

Multiplexer 210 inputs the translated real address from TLB 208 and further inputs a real address RA from a bus interface 232. In response to a select line 234, multiplexer 210 outputs either the translated real address (from TLB 208) or real address RA (from bus interface 232).

Accordingly, circuitry 200 supports two techniques for accessing information from cache memory array 202. According to the first technique, information is accessed in response to effective accessing address EA. According to the second technique, information is accessed in response to real address RA from bus interface 232. Thus, circuitry 200 supports access of information from cache memory array 202 in response either to effective accessing address EA or to real address RA. Such a combined technique is advantageous if the effective address lookup operation is successful because information is output more quickly from cache memory array 202 than if a real address set-associative lookup operation is used.

For accessing information in response to real address RA, real address RA is input from bus interface 232 and latched in a buffer 230 as shown in FIG. 5. Multiplexer 210 inputs the latched real address RA from buffer 230. Through multiplexer 210, real address RA is output to cache directory 216, to cache memory array 202, and to comparator 212. In response to bits $2^6$ through $2^{11}$ of real address RA, a multiplexer 233 of cache directory 216 selects a line of cache directory 216. Similarly, in response to bits $2^6$ through $2^{11}$ of real address RA, a multiplexer 235 of cache memory array 202 selects a block of cache memory array 202. If the selected line of cache directory 216 indicates that information for real address RA is actually stored in cache memory array 202, then circuitry 200 outputs information from the selected block of cache memory array 202.

By comparison, as discussed hereinabove, circuitry 200 also supports access of information in response to effective accessing address EA. With effective addressing, multiple effective addresses are translatable to a single associated real address. Such effective addressing is a useful technique for different processes accessing a common real address. For example, the processes can have different data protection schemes, accessing rights, and modification criteria. These characteristics can be associated with the effective address. Through SR 206 and TLB 208, effective accessing address EA is translated into an associated real address for suitably accessing information.

As previously mentioned, circuitry 200 supports access of information from cache memory array 202 in response either to effective accessing address EA or to real address RA. Notably, in the exemplary embodiment, effective addressing of information in cache memory array 202 is performed not merely by translation of effective accessing address EA into an associated real address. Instead, 32-bit effective accessing address EA is translated through SR 206 and TLB 208 into an associated real address in parallel with an effective address lookup operation in which decoder CAM array 214 selects a line in cache directory 216 and in cache memory array 202. In this manner, information in cache memory array 202 is quickly accessed, and translation of address EA does not add an additional cycle to the time for accessing information in cache memory array 202.

Figure 6:
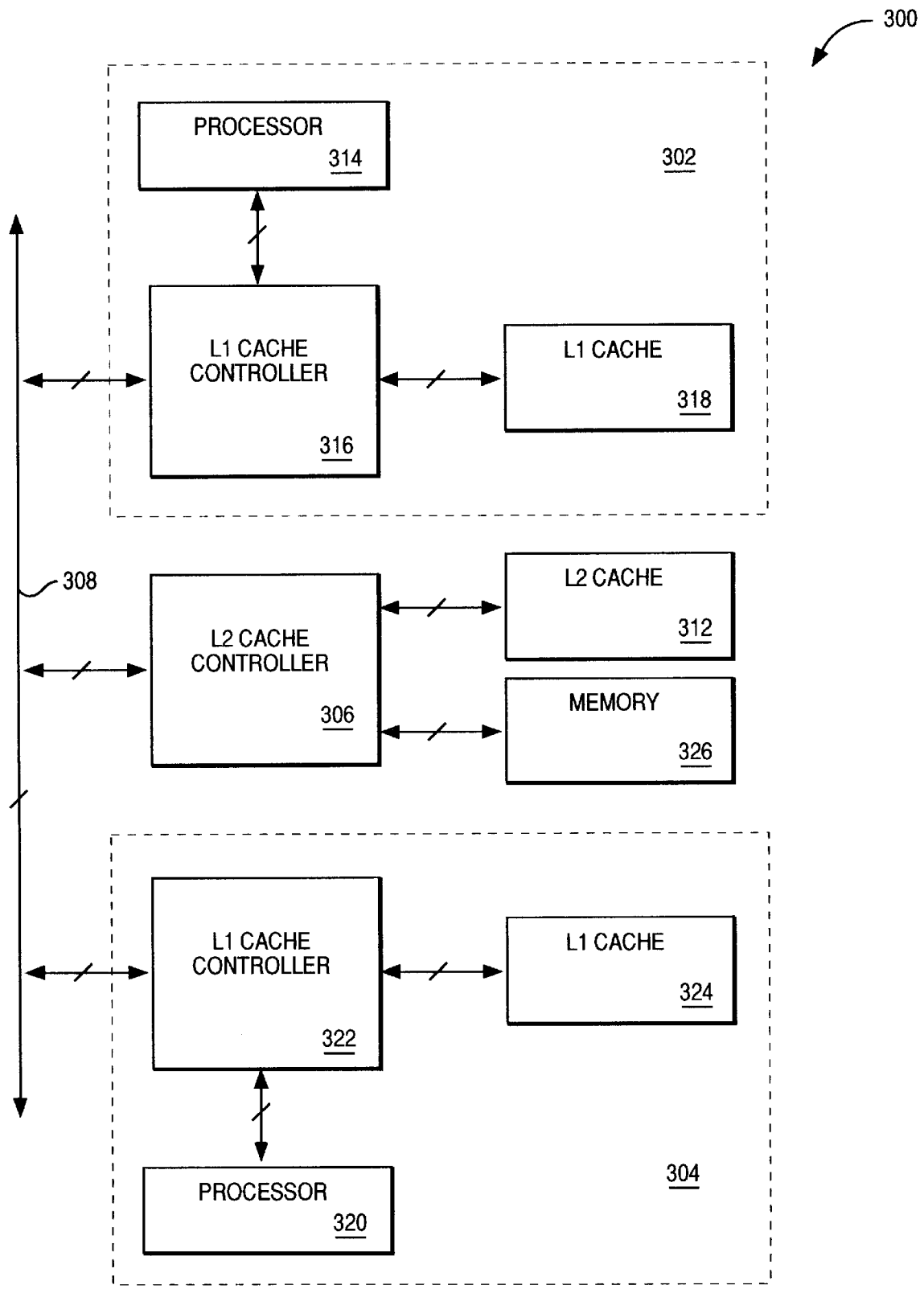
FIG. 6 is a block diagram of an exemplary system including first and second processing systems and a level 2 ("L2") cache memory.

FIG. 6 is a block diagram of an exemplary system, indicated generally at 300, including first and second processing systems 302 and 304, and a level 2 ("L2") cache controller 306, connected to one another through a system bus 308. L2 cache controller 306 controls an L2 cache memory 312 according to a real 4-way set-associative mapping technique. L2 cache memory 312 is accessed in response to real addresses.

Processing system 302 includes a processor 314, an L1 cache controller 316, and an L1 cache memory 318. L1 cache controller 316 is connected to system bus 308, to processor 314 and to L1 cache memory 318. L1 cache controller 316 controls L1 cache memory 318 according to the semi-associative mapping technique discussed further hereinabove in connection with FIGS. 3–5.

Likewise, processing system 304 includes a processor 320, an L1 cache controller 322, and an L1 cache memory 324. L1 cache controller 322 is connected to system bus 308, to processor 320 and to L1 cache memory 324. L1 cache controller 322 controls L1 cache memory 324 according to the semi-associative mapping technique discussed further hereinabove in connection with FIGS. 3–5.

Processing system 302 is a representative one of processing systems 302 and 304. Notably, the set of blocks in L1 cache memory 318 is a subset of the blocks in L2 cache memory 312. Any block of information stored in L2 cache memory 312 likewise can be stored in L1 cache memory 318.

Accordingly, L2 cache memory 312 is organized as a real-cache having a block size as least as large as the block size of L1 cache memory 318. If the number of blocks in L1 cache memory 318 is p, then any p blocks (out of the total number of blocks stored in L2 cache memory 312) can be stored in L1 cache memory 318. For multiprocessor and I/O cache consistency, a directory of L2 cache memory 312 stores a real address for each block stored in L1 cache memory 318.

Aliasing is supported on a page granularity, so that a real block of information can have different effective addresses. In an exemplary embodiment, the different effective addresses (corresponding to the same real block of information) differ by an integral multiple of 4 kilobytes, which is the page size. As an example, if the size of L1 cache memory 318 is 32 kilobytes with a block size of 64 bytes, then L1 cache memory 318 has 512 blocks. In addition to the 64 bytes of information, each block has directory information including a real address and various status bits.

Each of the 512 blocks in L1 cache memory 318 is associated with an effective address index. The effective address index is formed by bits $2^{12}$ through $2^c$ of the block's associated effective address. In the exemplary embodiment, c=19, and the effective address is either 32-bits or 64-bits in length. By searching L1 cache memory 318 in response to effective address EA (FIG. 5), one-cycle loads are achievable.

Referring also to FIG. 5, L1 cache memory 318 is formed by cache directory 216 and cache memory array 202. Accordingly, the association between an effective address and a block in L1 cache memory 318 is physically achieved by decoder CAM array 214 having 512 CAM entries. As discussed further hereinabove in connection with FIG. 5, each of the 512 CAM entries of decoder CAM array 214 has a respective output line connected (1) to a respective associated one of the 512 lines of cache directory 216 and (2) to a respective associated one of the 512 lines of cache memory array 202.

Each CAM entry of decoder CAM array 214 stores 9 bits, including an 8-bit effective address index and a valid bit. As discussed further hereinabove in connection with FIG. 5, if one of camlet entries 218 matches the effective address index of accessing address EA and is valid, then the matching CAM entry's respective output line is selected, thereby selecting an associated one of the 512 lines of cache directory 216 and of cache memory array 202. CAM entries of decoder CAM array 214 are managed so that only one output line is selected at any single moment.

Accordingly, if a camlet entry's effective address index matches the effective address index of accessing address EA and is valid, then a real address tag is output to comparator 212 from the respective entry of cache directory 216 associated with the matching camlet entry; moreover, a block of information is output to a multiplexer 224 from the respective block in cache memory array 202 associated with the matching camlet entry, and circuitry 200 sets decoder hit line 223 to a logic value of "1". In response to bits $2^0$ through $2^5$ of accessing address EA, multiplexer 224 outputs a word 226 from the block of information output by cache memory array 202, thereby avoiding a "late select" that otherwise occurs in a multi-way set-associative cache.

Referring again to FIG. 6, if no CAM entry's effective address index matches the effective block number and is valid, then processing system 302 inputs (through L2 cache controller 306) the real block of information from the real address (as translated through SR 206 and TLB 208) of L2 cache memory 312. L1 cache controller 316 maintains a 9-bit counter (as discussed further hereinabove in connection with assignment counter 116 of FIG. 4) having a value equal to a line number of L1 cache memory 318. Thus, L1 cache controller 316 is able to increment the 9-bit counter value from 0 to 511 and then back to 0. L1 cache controller 316 stores the input real block of information (from L2 cache memory 312) into a line of L1 cache memory 318 as specified by the 9-bit counter of L1 cache controller 316.

Occasionally, the input real block of information displaces a previously stored block of information in L1 cache memory 318. Accordingly, if the previously stored block of information is valid and modified, it is returned to L2 cache memory 312 to make space for the input real block of information. Then, L1 cache controller 316 stores the input real block of information in L1 cache memory 318 and increments the 9-bit counter value.

If one of camlet entries 218 matches the effective address index of accessing address EA, yet for some reason the translated real address from multiplexer 210 does not match the real address tag from cache directory 216, then the matching camlet entry is invalidated in decoder CAM array 214. Nevertheless, information remains unchanged in the respective block in cache memory array 202 and in cache directory 216 associated with the matching camlet entry. Then, processing system 302 inputs (through L2 cache controller 306) the real block of information from the real address (as translated through SR 206 and TLB 208) of L2 cache memory 312 as discussed hereinabove, as if none of camlet entries 218 matched the effective address index (of accessing address EA) and was valid.

On behalf of L1 cache memory 318, L1 cache controller 316 requests a real block of information from L2 cache controller 306 through system bus 308 by specifying the real address (as translated through SR 206 and TLB 208) and a 9-bit line number (i.e. the 9-bit counter value) of L1 cache memory 318 where the real block of information (from the real address of L2 cache memory 312) is to be stored. If the requested real block of information is not present in L2 cache memory 312, then L2 cache controller 306 inputs the requested real block of information from main memory 326 and executes a replacement operation in L2 cache memory 312. Since the set of blocks stored in L1 cache memory 318 is a subset of blocks stored in L2 cache memory 312, the replacement operation in L2 cache memory 312 might result in removal of a block from L1 cache memory 318. During the replacement operation, L2 cache controller 306 inputs the requested real block of information from main memory 326 and stores such information in L2 cache memory 312.

Moreover, L1 cache controller 316 inputs the requested real block of information from L2 cache controller 306 and stores such information at the specified 9-bit line number of cache memory array 202 (FIG. 5) of L1 cache memory 318. Further, L1 cache controller 316 updates the real address tag at the specified 9-bit line number of cache directory 216 (FIG. 5) of L1 cache memory 318. Also, L1 cache controller 316 updates the effective address index at the associated entry of decoder CAM array 214 (FIG. 5). In its directory, L2 cache memory 312 is able to record a respective 10-bit reverse index field for each real block of information stored in L1 cache memory 318. The 10-bit reverse index field includes a valid bit and a recorded 9-bit line number of L1 cache memory 318. The valid bit is set true if the real block of information is stored in the recorded 9-bit line number of L1 cache memory 318.

Aliasing is a situation where one real block has multiple corresponding effective addresses. Advantageously, in response to the 10-bit reverse index fields recorded in the directory of L2 cache memory 312, L2 cache controller 306 determines whether a requested real block of information is already stored in a valid line of L1 cache memory 318. If so, L2 cache controller 306 informs L1 cache controller 316 concerning the 9-bit line number of L1 cache memory 318 where the requested real block of information is already stored.

In response to such a situation, L1 cache memory 318 updates the effective address index at the associated entry of decoder CAM array 214 (FIG. 5). Notably, the effective address index is updated without replacement or repositioning. Accordingly, if the same effective address EA (FIG. 5) is again specified in buffer 204, L1 cache controller 316 does not repeatedly request the real block of information from L2 cache controller 306.

As an effective address cache, the semi-associative L1 cache memory 318 operates as effectively as a one-megabyte direct-mapped (or one-way set-associative) cache where 14-bit effective address indices are used. The miss ratio for L1 cache memory 318 is a function of its 32-kilobyte size and its semi-associative mapping. The associativity component of the miss ratio is upper bounded by the miss ratio of a one-megabyte direct-mapped (or one-way set-associative) cache. Accordingly, the dominant component of the miss ratio is size of L1 cache memory 318.

Notably, the cost of effective cache conflicts is merely the re-instantiation of a block already in L1 cache memory 318. The cost of aliasing is the same.

Referring to FIG. 5, with 64 camlets in decoder CAM array 214, cache memory array 202 is allocated to store information for all of 64 primary congruence classes at any single moment. In an exemplary embodiment, cache memory array 202 is further allocated to store information for up to eight of a primary congruence class's 256 secondary congruence classes at any single moment, because each camlet includes a respective set of eight camlet entries 218. All eight camlet entries 218 represent different ones of the 256 secondary congruence classes. In a camlet entry's associated entry of cache directory 216, a real address tag is stored including the high-order (m-j) real address bits of a single real block of information in main memory 326 (FIG. 6). Accordingly, in the exemplary embodiment, information for only a single real address of a primary/secondary congruence class is stored in cache memory array 202 at any single moment.

By comparison, in the preferred embodiment, information for two or more real addresses of a primary/secondary congruence class can be stored in cache memory array 202 at any single moment. Multiple ones of camlet entries 218 can represent the same secondary congruence class. This technique of the preferred embodiment is explained hereinbelow in connection with FIGS. 7a–e.

FIGS. 7a–e are conceptual illustrations of exemplary camlet 220 of decoder CAM array 214 (FIG. 5). Camlet 220 includes eight camlet entries 218, each having a respective one of 8-bit effective index fields 502a–h and a respective one of active bits 504a–h. Accordingly, each camlet entry has nine bits.

As an example, referring to FIG. 7a, initially effective index field 502a stores an index 0, effective index field 502b stores an index 1, effective index field 502c stores an index 2, effective index field 502d stores an index 3, effective index field 502e stores an index 4, effective index field 502f stores an index 5, effective index field 502g stores an index 6, and effective index field 502h stores an index 7. Each of indices 0–7 indicates a different congruence class.

Effective index fields 502a–h are respectively associated with active bits 504a–h. Each of active bits 504a–h indicates whether its associated effective index field stores a Not Most Recently Accessed ("NMRA") index within its congruence class. As shown in FIG. 7a, each of active bits 504a–h is initialized to a binary value of 0, thereby indicating each of effective index fields 502a–h stores a most recently accessed index within its congruence class.

Cache memory array 202 is accessed according to a three cycle process. During the first cycle, if a camlet entry of camlet 220 matches the effective address index of accessing address EA and is the most recently accessed camlet entry within its congruence class, then a real address tag is output to comparator 212 from the respective entry of cache directory 216 associated with the matching camlet entry; moreover, a block of information is output to multiplexer 224 from the respective block in cache memory array 202 associated with the matching camlet entry, and circuitry 200 sets decoder hit line 223 to a logic value of "1".

During the second cycle, if the effective address lookup operation is not successful for any reason (e.g. if the translated real address from multiplexer 210 does not match the real address tag from cache directory 216), then circuitry 200 executes a real address lookup operation as discussed further hereinabove in connection with FIG. 5 and 6. As part of the real address lookup operation, circuitry 200 determines whether the effective address index of accessing address EA matches any camlet entry of camlet 220 that is not the most recently accessed camlet entry within its congruence class. Moreover, in the presence of L2 cache memory 312, if the effective address lookup operation is not successful for any reason, then an L2 cache memory 312 access is started during the second cycle as discussed further hereinabove in connection with FIG. 6.

During the third cycle, if the real address lookup operation is successful, the successfully located information is output to multiplexer 224 from cache memory array 202; moreover, decoder CAM array 214 is updated as discussed further hereinbelow; also, if an L2 cache memory 312 access was started during the second cycle, such an access is cancelled. Alternatively, during the third cycle, if the real address lookup operation is not successful, then circuitry 200 replaces the least recently accessed camlet entry of camlet 220 (preferably, such replacement is performed during the second cycle if time permits).

For example, assume that the effective address index of accessing address EA is equal to index 2. Referring also to FIG. 7b, if the translated real address from multiplexer 210 does not match the real address tag from cache directory 216 during the first cycle, then circuitry 200 executes a real address lookup operation during a second cycle. If the real address lookup operation is not successful, and if index 6 (stored in field 502g) is the least recently accessed one of indices 0–7, then circuitry 200 stores index 2 in field 502g in place of index 6.

Also, circuitry 200 updates the associated line (corresponding to field 502g) in cache directory 216 (FIG. 5) to store the real address tag of the translated real address. Moreover, if the associated line (corresponding to field 502g) of cache memory array 202 stores valid modified information corresponding to previously stored index 6 of field 502g, then the information is returned to L2 cache memory 312; in this manner, the associated line of cache memory array 202 is vacated to store new input information for the translated real address. When the new block of information for the translated real address is received from L2 cache memory 312, circuitry 200 writes the block of information into the vacated line of cache memory array 202.

In such a situation, if a camlet entry of camlet 220 matched the effective address index of accessing address EA (FIG. 5) during the first cycle, then the active bit of the matching camlet entry is set inactive to a binary value of 1. For example, since index 2 (stored in field 502c) matched the effective address index of accessing address EA, active bit 504c is set to a binary value of 1, thereby indicating that field 502c stores a Not Most Recently Accessed ("NMRA") index within its congruence class. Thus, index 2 in field 502c is not replaced, but instead is designated NMRA. By comparison, active bit 504g is cleared to a binary value of 0.

Advantageously, as an NMRA designated entry, the line in cache memory array 202 (corresponding to index 2 in field 502c) remains accessible without resorting to L2 cache memory 312 (FIG. 6). In this manner, information for multiple real addresses of the single primary/secondary congruence class (represented by index 2) is stored in cache memory array 202 at a single moment. Camlet fields 502c and 502g store the same index 2 and consequently represent the same primary and secondary congruence classes. So long as active bit 504c is set to a binary value of 1, decoder CAM array 214 does not respond to a match between the index stored in field 502c and the effective address index of accessing address EA.

Subsequently, if index 2 (stored in field 502g) matches the effective address index of accessing address EA during a first cycle, yet the translated real address from multiplexer 210 does not match the real address tag from cache directory 216, then circuitry 200 executes a real address lookup operation during a second cycle for searching cache memory array 202 as a real r-way set-associative cache.

If the real address lookup operation is successful, and circuitry 200 determines that index 2 (stored in field 502c) is associated with the successfully located information in cache memory array 202, then circuitry 200 inverts the states of active bits 504c and 504g as shown in FIG. 7c. Thus, active bit 504c is cleared to a binary value of 0, and active bit 504g is set to a binary value of 1. Moreover, in such a situation, circuitry 200 outputs the associated information (corresponding to field 502c) from cache memory array 202. This technique for accessing information in cache memory array 202 is faster than accessing L2 cache memory 312 (FIG. 6).

By comparison, if the real address lookup operation is not successful, and if index 5 (stored in field 502f) is the least recently accessed index stored in fields 502a–h, then circuitry 200 stores index 2 in field 502f in place of index 5 as shown in FIG. 7d. Moreover, active bit 504f is cleared to a binary value of 0, and active bit 504g is set to a binary value of 1.

Also, circuitry 200 updates the associated line (corresponding to field 502f) in cache directory 216 (FIG. 5) to store the real address tag of the translated real address. Moreover, if the associated line (corresponding to field 502f) of cache memory array 202 stores valid modified information corresponding to previously stored index 5 of field 502f, then the information is returned to L2 cache memory 312; in this manner, the associated line of cache memory array 202 is vacated to store new input information for the translated real address. When the new block of information for the translated real address is received from L2 cache memory 312, circuitry 200 writes the block of information into the vacated line of cache memory array 202. Since index 2 (stored in fields 502c and 502g) matched the effective address index of accessing address EA, active bits 504c and 504g are set to a binary value of 1, thereby indicating that fields 502c and 502g store Not Most Recently Accessed ("NMRA") indices within their congruence class. Thus, index 2 in fields 502c and 502g is not replaced, but instead is designated NMRA.

Figure 7E:
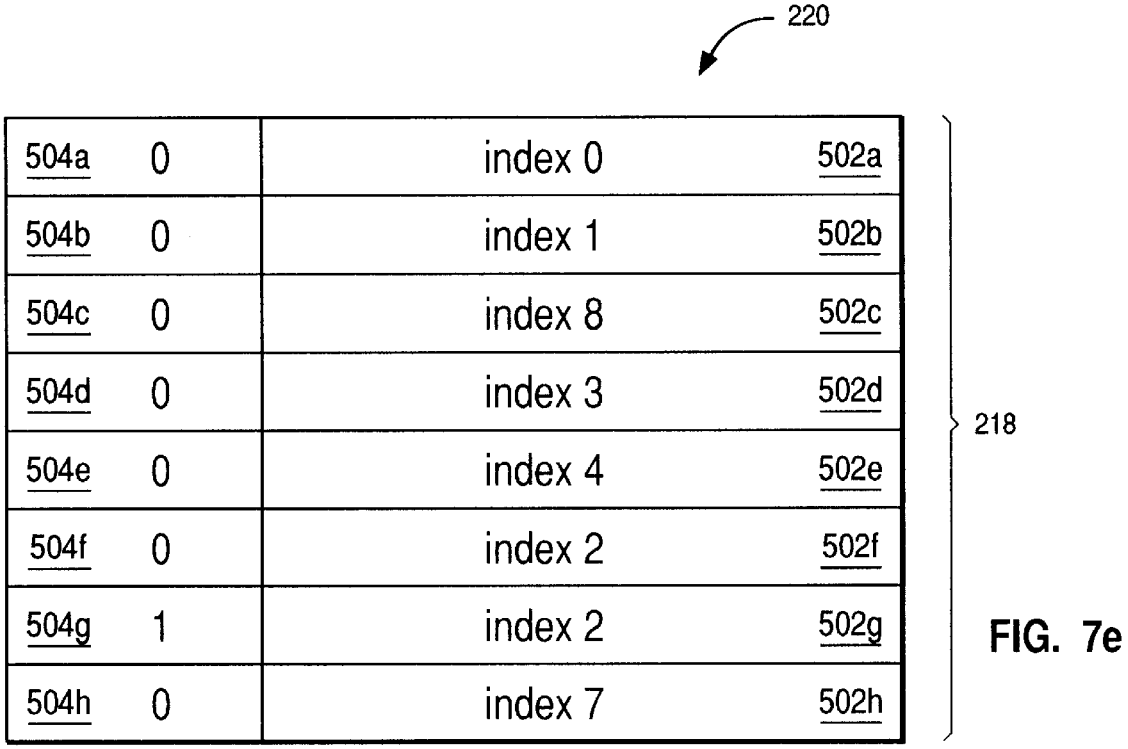

Referring also to FIG. 7e, if no index stored in fields 502a–h matches the effective address index of accessing address EA, if the real address lookup operation is not successful, and if index 2 (stored in field 502c) is the least recently accessed index stored in fields 502a–h, then circuitry 200 stores a new index (index 8) in field 502c in place of index 2 as shown in FIG. 7e. Moreover, active bit 504c is cleared to a binary value of 0.

Also, circuitry 200 updates the associated line (corresponding to field 502c) in cache directory 216 (FIG. 5) to store the real address tag of the translated real address. Moreover, if the associated line (corresponding to field 502c) of cache memory array 202 stores valid modified information corresponding to previously stored index 2 of field 502c, then the information is returned to L2 cache memory 312; in this manner, the associated line of cache memory array 202 is vacated to store new input information for the translated real address. When the new block of information for the translated real address is received from L2 cache memory 312, circuitry 200 writes the block of information into the vacated line of cache memory array 202.

Moreover, with continued reference to FIG. 7e, if no index stored in fields 502a–h matches the effective address index of accessing address EA, yet the real address lookup operation is successful in locating a line of cache memory array 202 corresponding to the translated real address, and if the located line of cache memory array 202 is associated with field 502c, then circuitry 200 stores the new index (index 8) in field 502c in place of index 2 and clears active bit 504c to a binary value of 0 as shown in FIG. 7e. This situation is an example of aliasing in which the real address has multiple effective addresses as indicated by index 2 and index 8.

In a first exemplary embodiment, the located line of cache memory array 202 is identified in response to the 10-bit reverse index fields recorded in the directory of L2 cache memory 312, as discussed further hereinabove in connection with FIG. 6.

In a second exemplary embodiment, circuitry 200 imposes a physical constraint that all effective addresses for a single real address have the same primary congruence class, so that such effective addresses select the same camlet of decoder CAM array 214. Accordingly, a particular real address is mappable into only preselected lines of cache memory array 202. With such a physical constraint, as discussed further hereinbelow in connection with FIG. 8, a particular line of cache memory array 202 (and the liners associated entry within the selected camlet) is readily identifiable as storing information for the translated real address. Such a technique avoids the extra directory space otherwise used for storing reverse indices.

Accordingly, if the translated real address from multiplexer 210 does not match the real address tag from cache directory 216 (FIG. 5), then circuitry 200 executes a real address lookup operation as discussed further hereinabove in connection with FIGS. 5 and 6. If the real address lookup operation is not successful, then circuitry 200 writes bits $2^{44}$ through $2^{51}$ of accessing address EA into the least recently accessed camlet entry in camlet 220; moreover, circuitry 200 clears the active bit of such a least recently accessed camlet entry, sets (thereby indicating NMRA) the active bit of any camlet entry that previously matched accessing address EA, suitably updates the camlet entry's associated line of cache directory 216, and writes information for accessing address EA into the camlet entry's associated line of cache memory array 202 when such information is available (sometime after the third cycle). If the real address lookup operation is successful in locating a line of cache memory array 202 corresponding to the translated real address, then circuitry 200 writes bits $2^{44}$ through $2^{51}$ of accessing address EA into the camlet entry associated with the located line of cache memory array 202; moreover, circuitry 200 clears the active bit of such a camlet entry and sets the active bit of any camlet entry that previously matched accessing address EA.

Figure 8A:
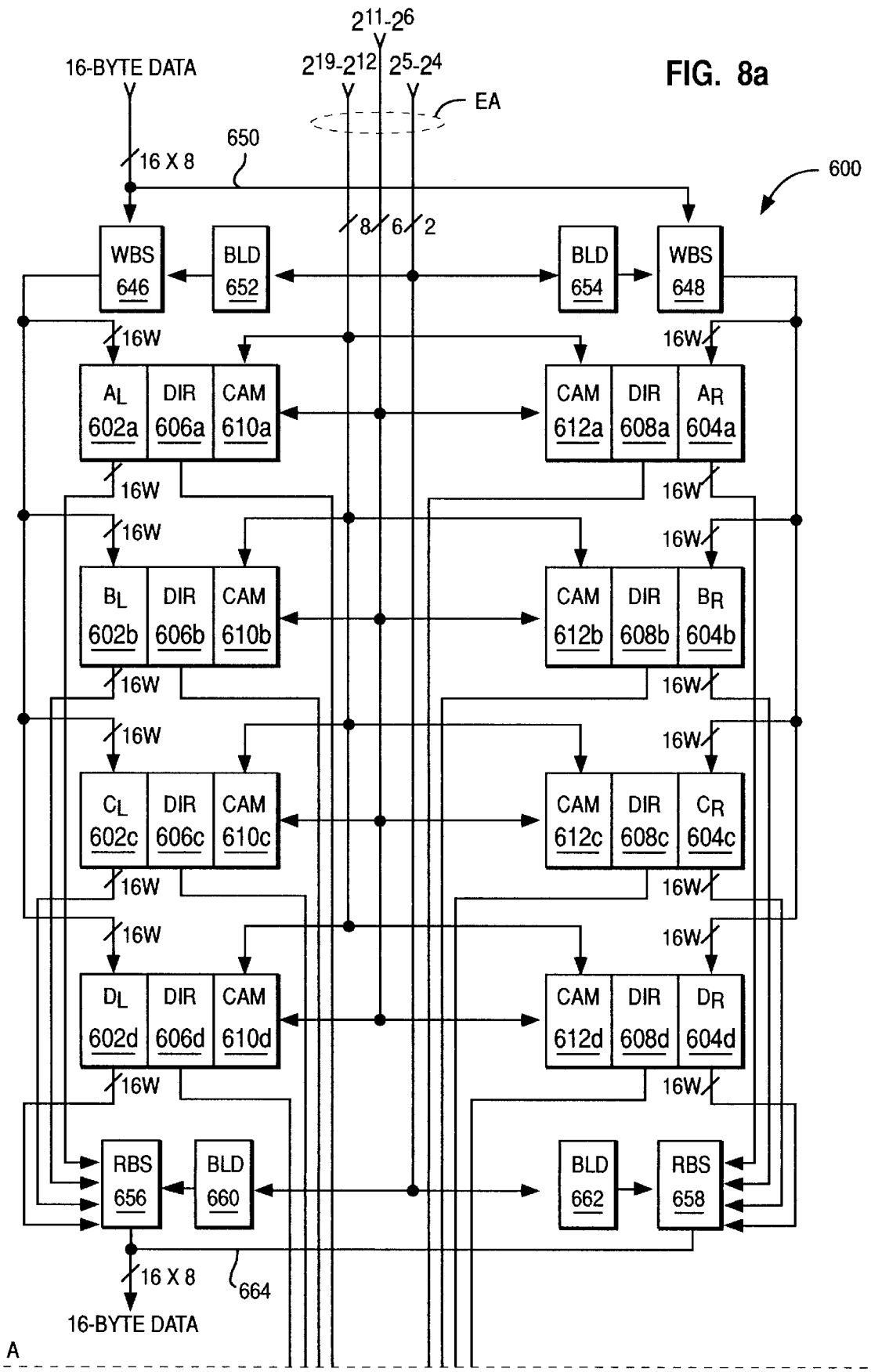
FIGS. 8a–b (hereinafter collectively referred to as "FIG. 8") are block diagrams of third exemplary circuitry for caching information according to the semi-associative mapping technique of FIG. 3 and to the circuitry of FIG. 5.
Figure 8B:
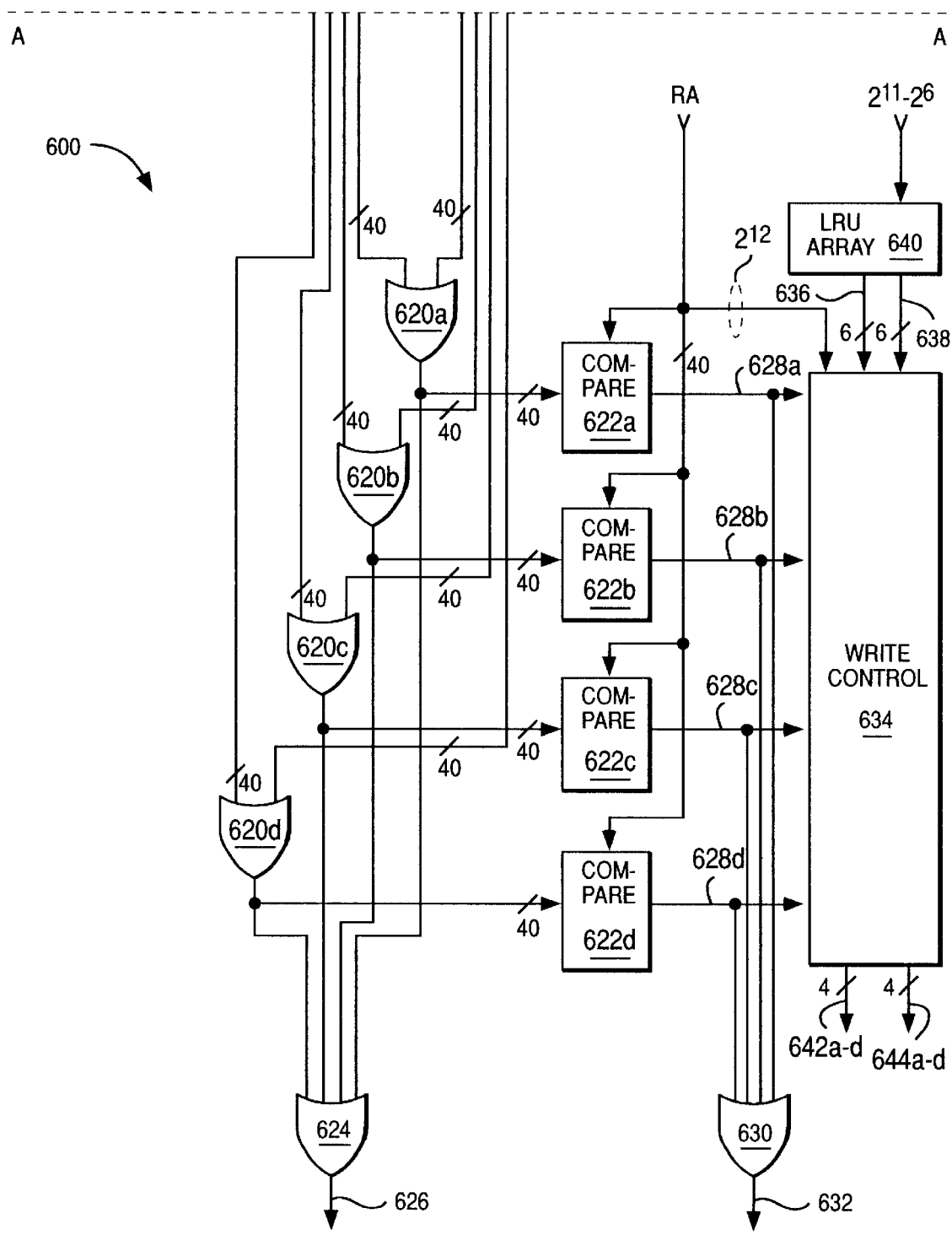

FIG. 8 is a block diagram of third exemplary circuitry, indicated generally at 600, for caching information according to the semi-associative mapping technique of FIG. 3 and circuitry 200 of FIG. 5. In FIG. 8, L1 cache memory array 202 (FIG. 5) is formed by four upper subarrays 602a–d (respectively named $A_L$, $B_L$, $C_L$ and $D_L$) and by four lower subarrays 604a–d (respectively named $A_R$, $B_R$, $C_R$ and $D_R$). Each of subarrays 602a–d and 604a–d has a size of 4 kilobytes, such that the size of L1 cache memory array 202 is 32 kilobytes. Each subarray has 64 lines, and each line stores a block of 64 bytes=16 4-byte words ("16W"). Thus, L1 cache memory array 202 has $2^k$=512 lines, where k=9.

Cache directory 216 (FIG. 5) is formed by four upper directory units ("DIR") 606*a–d* and by four lower directory units 608*a–d*. Each directory unit has 64 lines, and each line stores a 40-bit tag. Decoder CAM array 214 (FIG. 5) is formed by four upper CAM units 610*a–d* and by four lower CAM units 612*a–d*. Each CAM unit has 64 lines, and each line stores a 9-bit camlet entry (as discussed further hereinabove in connection with FIGS. 7*a–e*).

A camlet includes eight camlet entries, more particularly one entry from each of CAM units 610*a–d* and 612*a–d*. Since each CAM unit has 64 entries, CAM units 610*a–d* and 612*a–d* together provide 64 camlets. One of the 64 camlets is selected in response to bits $2^6$ through $2^{11}$ of accessing address EA. For example, if bits $2^6$ through $2^{11}$ of accessing address EA are 000000, then line 0 is selected in each of CAM units 610*a–d* and 612*a–d*, thereby forming a selected camlet 0.

CAM units 610*a–d* are respectively connected to directory units 606*a–d*, which are respectively integral with subarrays 602*a–d*. Likewise, CAM units 612*a–d* are respectively connected to directory units 608*a–d*, which are respectively integral with subarrays 604*a–d*. Notably, each CAM unit, directory unit, and subarray has 64 lines. Accordingly, connected units 610*a*, 606*a* and 602*a* operate in the manner discussed hereinabove in connection with connected units 102, 104 and 106 of FIG. 4, and similarly for each of the other seven groups of connected units in FIG. 8.

If line 0 is selected in response to bits $2^6$ through $2^{11}$ of accessing address EA, and if line 0 of CAM unit 610*a* stores information matching bits $2^{12}$ through $2^{19}$ of accessing address EA, then CAM unit 610*a* directly selects line 0 of directory unit 606*a* and of subarray 602*a*. In response to being selected by CAM unit 610*a*, directory unit 606*a* outputs the 40-bit tag stored in its line 0; likewise, subarray 602*a* outputs the 16-word (64-byte) block of information stored in its line 0. Stated more generally, if a line y is selected in response to bits $2^6$ through $2^{11}$ of accessing address EA, and if line y of a CAM unit stores information matching bits $2^{12}$ through $2^{19}$ of accessing address EA, then the CAM unit directly selects line y of its connected directory unit and subarray. In response to being selected by its connected CAM unit, a directory unit outputs the 40-bit tag stored in its line y; likewise, the connected subarray outputs the 16-word block of information stored in its line y. If none of a directory unit's lines is selected by the directory unit's connected CAM unit, then the directory unit's 40-bit output is at high-impedance.

As discussed hereinabove in connection with FIGS. 7*a–e*, circuitry 600 imposes a physical constraint that all effective addresses for a single real address have the same primary congruence class, so that such effective addresses select the same camlet. Accordingly, a particular real address is mappable into only preselected lines of subarrays 602*a–d* and 604*a–d*. With such a physical constraint, a particular line of the selected camlet (and likewise the particular line's connected directory line and subarray line) is readily identifiable as being associated with stored information for a translated real address. Such a technique avoids the extra directory space otherwise used for storing reverse indices.

More particularly, in FIG. 8, information for a translated real address can be stored in one of four lines of subarrays 602*a–d* or alternatively in one of four lines of subarrays 604*a–d*. In consideration of such a design, during the second cycle, four of a camlet's eight lines are selected in response to bit $2^{12}$ of the translated real address RA, so that the four selected camlet lines are either all in CAM units 612*a–d* or all in CAM units 610*a–d*. Information for the translated real address RA can be stored in one of the four subarray lines respectively connected to the four selected camlet lines.

Since circuitry 600 imposes such a physical constraint, an OR gate 620*a* performs a logical OR operation on the 40-bit outputs from directory units 606*a* and 608*a*; a 40-bit output from OR gate 620*a* is input by a comparator 622*a*. Likewise, an OR gate 620*b* performs a logical OR operation on the 40-bit outputs from directory units 606*b* and 608*b*; a 40-bit output from OR gate 620*b* is input by a comparator 622*b*. Moreover, an OR gate 620*c* performs a logical OR operation on the 40-bit outputs from directory units 606*c* and 608*c*; a 40-bit output from OR gate 620*c* is input by a comparator 622*c*. Also, an OR gate 620*d* performs a logical OR operation on the 40-bit outputs from directory units 606*d* and 608*d*; a 40-bit output from OR gate 620*d* is input by a comparator 622*d*.

An OR gate 624 performs a logical OR operation on the 40-bit outputs from OR gates 620*a–d*. If any bit of these 40-bit outputs is set to a logic value of "1", then an output 626 of OR gate 624 is set to a logic value of "1". In this manner, output 626 of OR gate 624 provides the function of decoder hit line 223 discussed further hereinabove in connection with FIG. 5.

Bits $2^{12}$ through $2^{51}$ of the translated real address RA are compared with the 40-bit outputs from OR gates 620*a–d* by comparators 622*a–d*, respectively. If bits $2^{12}$ through $2^{51}$ of the translated real address RA match the 40-bit output from OR gate 620*a*, then comparator 622*a* sets its output 628*a* to a logic value of "1". Likewise, if bits $2^{12}$ through $2^{51}$ of the translated real address RA match the 40-bit output from OR gate 620*b*, then comparator 622*b* sets its output 628*b* to a logic value of "1". Moreover, if bits $2^{12}$ through $2^{51}$ of the translated real address RA match the 40-bit output from OR gate 620*c*, then comparator 622*c* sets its output 628*c* to a logic value of "1". Also, if bits $2^{12}$ through $2^{51}$ of the translated real address RA match the 40-bit output from OR gate 620*d*, then comparator 622*d* sets its output 628*d* to a logic value of "1".

An OR gate 630 performs a logical OR operation on outputs 628*a–d*. If any of outputs 628*a–d* is set to a logic value of "1", then an output 632 of OR gate 630 is set to a logic value of "1". In this manner, output 632 of OR gate 630 provides the function of directory hit line 222 discussed further hereinabove in connection with FIG. 5.

In response to bits $2^6$ through $2^{11}$ of accessing address EA, an LRU array 640 indicates through a 6-bit least recently used ("LRU") status word 636 the relative least recently used order of the four subarray lines (in subarrays 602*a–d*) respectively connected to the four camlet lines selected in CAM units 610*a–d* in response to bits $2^6$–$2^{11}$ of accessing address EA; moreover, LRU array 640 indicates through a 6-bit LRU status word 638 the relative least recently used order of the four subarray lines (in subarrays 604*a–d*) respectively connected to the four camlet lines selected in CAM units 612*a–d* in response to bits $2^6$–$2^{11}$ of accessing address EA. For example, 6-bit status word 636 can indicate the selected line in subarray 602*c* was accessed more recently than the selected line in subarray 602*b*; the selected line in subarray 602*b* was accessed more recently than the selected line in subarray 602*a*; and the selected line in subarray 602*a* was accessed more recently than the selected line in subarray 602*d*.

A write control unit 634 inputs bit $2^{12}$ of the translated real address RA, together with outputs 628a–d of comparators 622a–d. Moreover write control unit 634 inputs LRU status words 636 and 638 from LRU array 640. In response to these inputs, write control unit 634 outputs control lines 642a–d to subarrays 602a–d, respectively; moreover, write control unit 634 outputs control lines 644a–d to subarrays 604a–d, respectively. For clarity, connections from control lines 642a–d and 644a–d to subarrays 602a–d and 604a–d are not shown in FIG. 8. In response to control lines 642a–d and 644a–d, only one of the eight subarrays 602a–d and 604a–d is selected for inputting data.

In response to being selected for inputting information, each of subarrays 602a–d is able to input 16-word information from a write bit switch ("WBS") 646 as shown in FIG. 8. Likewise, in response to being selected for inputting information, each of subarrays 604a–d is able to input 16-word information from a write bit switch ("WBS") 648 as shown in FIG. 8. The 16-word information from write bit switches 646 and 648 includes four 4-word information blocks.

In response to bits $2^5$ and $2^4$ of accessing address EA, a bit line decoder ("BLD") 652 outputs an indication to write bit switch 646. Moreover, write bit switch 646 inputs 4-word (16-byte) information from a data bus 650. In response to the indication from bit line decoder 652, write bit switch 646 inserts the 4-word information from data bus 650 into one of the four 4-word information blocks output to subarrays 602a–d.

Likewise, in response to bits $2^5$ and $2^4$ of accessing address EA, a bit line decoder ("BLD") 654 outputs an indication to write bit switch 648. Moreover, write bit switch 648 inputs 4-word (16-byte) information from data bus 650. In response to the indication from bit line decoder 654, write bit switch 648 inserts the 4-word information from data bus 650 into one of the four 4-word information blocks output to subarrays 604a–d.

Each of subarrays 602a–d is able to output respective 16-word information to a read bit switch ("RBS") 656 as shown in FIG. 8. Since only one of subarrays 602a–d is selected in response to bits $2^{19}$ through $2^{12}$ of accessing address EA, read bit switch 656 logically OR's the 16-word information input from each of subarrays 602a–d. In response to bits $2^5$ and $2^4$ of accessing address EA, a bit line decoder ("BLD") 660 outputs an indication to read bit switch 656. In response to this indication from bit line decoder 660, read bit switch 656 selects one of the four 4-word information blocks (of the logically OR'ed 16-word information) and outputs the selected 4-word information block to a data bus 664.

Likewise, each of subarrays 604a–d is able to output respective 16-word information to a read bit switch ("RBS") 658 as shown in FIG. 8. Since only one of subarrays 604a–d is selected in response to bits $2^{19}$ through $2^{12}$ of accessing address EA, read bit switch 658 logically OR's the 16-word information input from each of subarrays 604a–d. In response to bits $2^5$ and $2^4$ of accessing address EA, a bit line decoder ("BLD") 662 outputs an indication to read bit switch 658. In response to this indication from bit line decoder 662, read bit switch 658 selects one of the four 4-word information blocks (of the logically OR'ed 16-word information) and outputs the selected 4-word information block to data bus 664.

In order to achieve hit ratios comparable to those for a four-way set-associative cache, j=5. Accordingly, the number ($2^{k+j}$) of congruence classes is greater than the number ($2^k$) of cache memory lines. Each cache memory line is accessed in response to 14 bits ($2^{19}$ through $2^6$ of accessing address EA) of decoding.

The 14 (k+j) bits, $2^6$ through $2^{19}$, of accessing address EA form an effective index or name for each line. The congruence class of an effective address EA is specified by the index (k+j) address bits of the effective address EA. Accordingly, each congruence class includes numerous effective addresses, all of which share the same index (k+j) address bits. Bits $2^6$ through $2^{11}$ of accessing address EA specify a primary congruence class, and bits $2^{12}$ through $2^{19}$ specify a secondary congruence class.

Notably, in the preferred embodiment, information for the translated real address can be stored in one of eight lines of subarrays 602a–d and 604a–d. Unlike FIG. 8, bit $2^{12}$ of the translated real address is not used to select four of a camlet's eight lines in the preferred embodiment. Accordingly, information for the translated real address can be stored in any one of a camlet's eight lines.

Thus, the preferred embodiment does not include OR gates 620a–d. Instead, the preferred embodiment includes four more comparators in addition to comparators 622a–d for a total of eight such comparators. The eight comparators respectively compare the translated real address RA with the 40-bit outputs from directory units 606a–d and 608a–d. Outputs from all eight comparators are input by OR gate 630 and by write control unit 634.

Although an exemplary embodiment of the present invention and its advantages have been described in detail hereinabove, they have been described as example and not as limitation. Various changes, substitutions and alterations can be made in the exemplary embodiment without departing from the breadth, scope and spirit of the present invention. The breadth, scope and spirit of the present invention should not be limited by the exemplary embodiment, but should be defined only in accordance with the following claims and equivalents thereof.

What is claimed is:

1. Circuitry, comprising:
   a system memory including a first plurality of memory locations for storing information, said first plurality being arranged into multiple congruence classes of memory locations, said congruence classes including at least a first congruence class and a second congruence class each having more than one memory location;
   a cache memory coupled to said system memory and including a second plurality of memory locations for storing information from said first plurality of memory locations; and
   a directory coupled to said cache memory and including a plurality of directory locations for storing information relating said first and second pluralities of memory locations, said directory locations including a first directory location for storing information relating a particular one of said second plurality of memory locations to a particular one of said first plurality of memory locations,
      wherein said particular one of said first plurality of memory locations is able to be any memory location of any of said congruence classes including said first congruence class, and
      wherein said multiple congruence classes are greater than said plurality of directory locations and said first directory location is dynamically associated with any one of said plurality of congruence classes, including either said first or second congruence class.

2. The circuitry of claim 1 wherein said cache memory is an L1 cache memory, and further comprising an L2 cache memory coupled between said L1 cache and system memories for storing information indicating which of said second plurality of memory locations stores information from said first plurality of memory locations.

3. The circuitry of claim 2 wherein at least said first directory location is able to store effective address information and real address information.

4. The circuitry of claim 3 wherein said directory comprises:

a content-addressable-memory array for storing said effective address information; and a cache directory for storing said real address information.

5. The circuitry of claim 4 and further comprising circuitry for comparing an effective address of at least one of said first plurality of memory locations with said effective address information of said directory and for outputting at least one first signal in response thereto.

6. The circuitry of claim 5 wherein said circuitry for comparing is integral with said content-addressable-memory array.

7. A method, comprising:

storing information in a first plurality of memory locations, said first plurality being arranged into multiple congruence classes of memory locations, said congruence classes including at least a first congruence class and a second congruence class each having more than one memory location;

storing, in a second plurality of memory locations, information from said first plurality of memory locations; and storing, in a plurality of directory locations, information relating said first and second pluralities of memory locations, said directory locations including a first directory location for storing information relating a particular one of said second plurality of memory locations to a particular one of said first plurality of memory locations, wherein said particular one of said first plurality of memory locations is able to be any memory location of any of more than one of said congruence classes including said first congruence class, and wherein said multiple congruence classes are greater than said plurality of directory locations and said first directory location is dynamically associated with any one of said plurality of congruence classes, including either said first or second congruence class.

8. The method of claim 7 wherein said step of storing information relating said first and second pluralities of memory locations comprises the step of simultaneously storing, in a second directory location, information relating another one of said second plurality of memory locations to another one of said first plurality of memory locations, wherein said particular one of said first plurality of memory locations and said another one of said first plurality of memory locations are memory locations of said first congruence class.

9. The method of claim 7 wherein said step of storing information relating said first and second pluralities of memory locations comprises the step of storing, in said first directory location, information relating said particular one of said second plurality of memory locations to said particular one of said first plurality of memory locations, said particular one of said first plurality of memory locations being a memory location of said first congruence class without excluding said directory locations from simultaneously storing information relating another one of said second plurality of memory locations to any other one of said first plurality of memory locations of any other one of said congruence classes.

10. The method of claim 7 wherein said step of storing information relating said first and second pluralities of memory locations comprises the step of storing, in said directory locations, information indicating particular ones of said first plurality of memory locations from which said second plurality of memory locations stores information.

11. The method of claim 10 wherein said step of storing information indicating particular ones of said first plurality of memory locations comprises the step of storing, in said directory locations, information including less than all bits of addresses of said particular ones of said first plurality of memory locations.

12. The method of claim 7 wherein said step of storing information relating said first and second pluralities of memory locations comprises the step of storing, in at least said first directory location, effective address information and real address information.

13. The method of claim 12 and further comprising the step of comparing an effective address of at least one of said first plurality of memory locations with said effective address information of at least said first directory location and outputting at least one first signal in response thereto.

14. The method of claim 13 and further comprising the step of outputting information from at least one of said second plurality of memory locations in response to said first signal indicating said effective address matches said effective address information of said first directory location.

15. The method of claim 13 and further comprising the step of translating said effective address into a real address.

16. The method of claim 15 and further comprising the step of comparing said real address with said real address information of at least said first directory location and outputting at least one second signal in response thereto.

17. The method of claim 16 and further comprising the step of modifying said effective address information of said first directory location to match said effective address, in response to said second signal indicating said real address matches said real address information of said first directory location and to said first signal indicating said effective address fails to match said effective address information of said first directory location.

18. The method of claim 16 wherein said step of comparing comprises the step of comparing said real address with said real address information of said first directory location in response to said first signal indicating said effective address matches said effective address information of said first directory location.

19. The method of claim 16 and further comprising the step of receiving information from said particular one of said second plurality of memory locations in response to said second signal indicating said real address matches said real address information of said first directory location.

20. The method of claim 16 wherein said step of storing information relating said first and second pluralities of memory locations comprises the step of simultaneously storing, in a second directory location, information relating another one of said second plurality of memory locations to another one of said first plurality of memory locations, wherein said particular one of said first plurality of memory locations and said another one of said first plurality of memory locations are memory locations of said first congruence class.

21. The method of claim 20 and further comprising the step of designating said first directory location as not-most-recently-allocated relative to said second directory location in response to said second signal indicating said real address fails to match said real address information of said first directory location, and said real address matching real address information of said second directory location.

* * * * *